United States Patent
Kumar et al.

(10) Patent No.: US 9,982,083 B2
(45) Date of Patent: May 29, 2018

(54) POLYISO-UREA

(71) Applicant: BASF SE, Ludwigshafen (DE)

(72) Inventors: Rajesh Kumar, Riverview, MI (US); Nikolay Lebedinski, West Bloomfield, MI (US)

(73) Assignee: BASF SE, Ludwigshafen (DE)

( * ) Notice: Subject to any disclaimer, the term of this patent is extended or adjusted under 35 U.S.C. 154(b) by 0 days. days.

(21) Appl. No.: 15/120,292

(22) PCT Filed: Feb. 19, 2015

(86) PCT No.: PCT/US2015/016566
§ 371 (c)(1),
(2) Date: Aug. 19, 2016

(87) PCT Pub. No.: WO2015/127041
PCT Pub. Date: Aug. 27, 2015

(65) Prior Publication Data
US 2017/0058075 A1 Mar. 2, 2017

Related U.S. Application Data

(60) Provisional application No. 61/942,351, filed on Feb. 20, 2014, provisional application No. 62/092,507, filed on Dec. 16, 2014.

(51) Int. Cl.
C08G 18/00 (2006.01)
C08G 18/09 (2006.01)
C08G 18/76 (2006.01)
C08G 18/02 (2006.01)
C08G 18/67 (2006.01)
C08G 18/71 (2006.01)

(52) U.S. Cl.
CPC ......... C08G 18/095 (2013.01); C08G 18/025 (2013.01); C08G 18/672 (2013.01); C08G 18/673 (2013.01); C08G 18/71 (2013.01); C08G 18/7621 (2013.01)

(58) Field of Classification Search
None
See application file for complete search history.

(56) References Cited

U.S. PATENT DOCUMENTS

| 3,056,835 | A | 10/1962 | Monagle, Jr. et al. |
| 3,152,131 | A | 10/1964 | Heberling, Jr. |
| 3,406,197 | A | 10/1968 | Ulrich |
| 3,406,198 | A | 10/1968 | Budnick |
| 3,522,303 | A | 7/1970 | Ulrich |
| 4,143,063 | A | 3/1979 | Alberino |
| 4,321,394 | A | 3/1982 | Schaefer et al. |
| 4,328,138 | A | 5/1982 | Lin et al. |
| 5,079,326 | A | 1/1992 | Suzuki et al. |
| 5,258,481 | A | 11/1993 | Hesselmans et al. |
| 5,821,325 | A | 10/1998 | Yahata et al. |
| 6,103,836 | A * | 8/2000 | Imashiro ............. C08G 18/095 525/452 |
| 6,489,503 | B1 | 12/2002 | Narayan et al. |
| 2006/0194939 | A1 | 8/2006 | Licht et al. |

FOREIGN PATENT DOCUMENTS

| DE | 956 499 C | 1/1957 |
| EP | 0 628 582 A2 | 12/1994 |
| EP | 0 881 243 A1 | 12/1998 |
| EP | 1 476 406 A | 8/2003 |
| WO | WO 03/068703 A1 | 8/2003 |
| WO | WO 2013/033186 A1 | 3/2013 |

OTHER PUBLICATIONS

International Search Report for Application No. PCT/US2015/016561 dated May 15, 2015, 3 pages.
International Search Report for Application No. PCT/US2015/016566 dated May 20, 2015, 3 pages.
Machine-Assisted English translation for DE 956 499 extracted from the espacenet.com database on Sep. 22, 2016, 10 pages.
English language abstract not found for EP 1 476 406; however, see English language equivalent U.S. 2006/0194939 of corresponding document WO 03/068703. Original document WO 03/068703 extracted from espacenet.com database on Sep. 26, 2016, 28 pages.

* cited by examiner

Primary Examiner — Ana L Woodward
(74) Attorney, Agent, or Firm — DLA Piper LLP (US)

(57) ABSTRACT

A composition for forming a polyiso-urea includes a capped polycarbodiimide and a polyol. The capped polycarbodiimide comprises the reaction product of a diisocyanate and a monoisocyanate in the presence of an oxygen scavenger and a carbodiimidization catalyst and in the absence of solvent, has 0.25 wt. % or less of free isocyanate groups, and is a liquid at 25° C. A polyiso-urea comprises the reaction product of the capped polycarbodiimide and the polyol.

12 Claims, 8 Drawing Sheets

POLYISO-UREA

CROSS-REFERENCE TO RELATED APPLICATIONS

This application is the National Stage of International Patent Application No. PCT/US2015/016566, filed on Feb. 19, 2015, which claims priority to and all the advantages of U.S. Provisional Patent Application Nos. 61/942,351, filed on Feb. 20, 2014, and 62/092,507, filed on Dec. 16, 2014, the content of which is incorporated herein by reference.

BACKGROUND OF THE DISCLOSURE

1. Field of the Disclosure

The subject disclosure generally relates to a composition for forming a polyiso-urea.

2. Description of the Related Art

Poly-ureas are generally known in the art, and are used in a wide variety of commercial products including lubricants, adhesives, sealants, coatings, composites, and even as an elastomeric resin. Poly-ureas are typically formed via the polymerization (polyaddition) of isocyanate functional moiety (e.g. diisocyanates) and amine functional moiety (e.g. polyamines). Such moieties typically react quickly, without a catalyst, to form the polyureas which are chemically stable and have the following general structure:

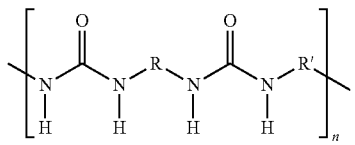

In contrast to poly-ureas, polyiso-ureas are not as easy to form and thus do not share the commercial popularity of poly-ureas. There is a need in the art for an efficient method of forming polyiso-ureas which produces polyiso-ureas which can be tailored to specific applications and thus used in a wide variety of commercial products including lubricants, adhesives, sealants, coatings, composites, and even as an elastomeric resin.

SUMMARY OF THE DISCLOSURE AND ADVANTAGES

The subject disclosure provides a composition for forming a polyiso-urea comprising a capped polycarbodiimide and a polyol. The capped polycarbodiimide comprises the reaction product of a diisocyanate and a monoisocyanate in the presence of an oxygen scavenger and a catalyst and in the absence of solvent, has 0.25 wt. % or less of free isocyanate groups, and is a liquid at 25° C. The subject disclosure also provides a polyiso-urea comprising the reaction product of the capped polycarbodiimide and the polyol.

In one embodiment, the polyiso-urea has the following formula:

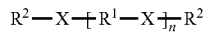

wherein each $R^1$ is independently an alkyl, a cycloalkyl, an aromatic, a heterocyclic, or a heteroaryl group;

each X is independently:
a carbodiimide group having the following structure:

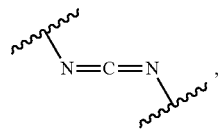 [SMILES: *N=C=N*]

or
an iso-urea group having the following structure:

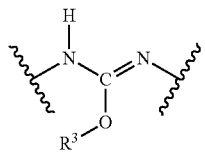

or optical and geometric isomers thereof;
wherein at least one X is polyiso-urea group and $R^3$ is independently an alkyl, a cycloalkyl, an aromatic, a heterocyclic, or a heteroaryl group;
each $R^2$ is independently an alkyl, a cycloalkyl, an aromatic, a heterocyclic, or a heteroaryl group; and
n is an integer from 1 to 50.

The composition is liquid at room temperature and stable. Further, the instant composition reacts consistently to form polyiso-urea which can be tailored to specific applications.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION OF THE DISCLOSURE

Figure 1:
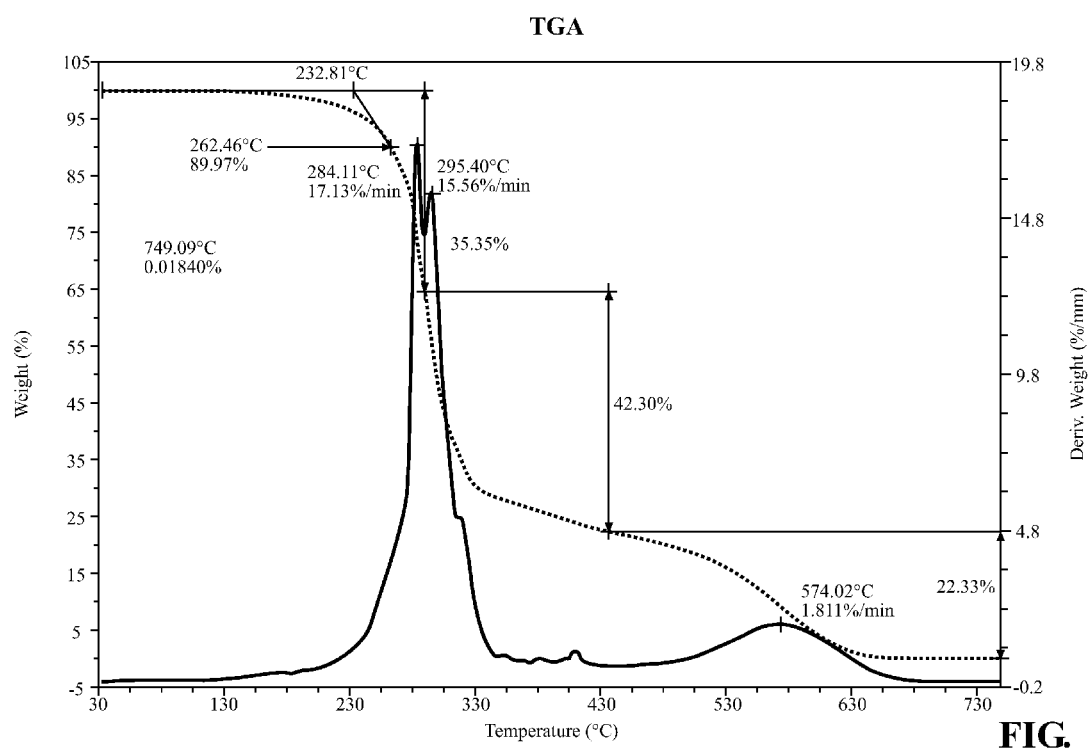
FIG. 1 is a thermal gravimetric analysis (TGA) of the chemical reaction of a composition comprising a polycarbodiimide and a polyol, and the subsequent formation of a polyiso-urea.

The present disclosure provides a composition for forming a polyiso-urea ("the composition"), a method of preparing the polyiso-urea ("the method"), and the polyiso-urea, which are each described in detail, in-turn below. Various embodiments of the composition, the method, and the polyiso-urea are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The composition includes a capped polycarbodiimide ("the polycarbodiimide") and a polyol. The polycarbodiimide comprises the reaction product of a diisocyanate and a monoisocyanate in the presence of an oxygen scavenger and a carbodiimidization catalyst and in the absence of solvent, has 0.25 wt. % or less of free isocyanate groups, and is a liquid at 25° C.

In general, "substituted" refers to an alkyl, alkenyl, alkynyl, aryl, or ether group, as defined below (e.g. an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include; halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group. Alkylene groups are divalent alkyl groups. Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6- disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched, or cyclic alkyl groups having 2 to about 28 carbon atoms, and further including at least one double bond. In some embodiments alkenyl groups have from 1 to 12 carbons, or, typically, from 1 to 8 carbon atoms. Alkenyl groups may be substituted or unsubstituted. Exemplary alkenyl groups include vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=$CH_2$, $OCH_2$, or C=$CHCH_3$.

As used herein, "aryl", or "aromatic," groups are cyclic aromatic hydrocarbons that do not contain hetero atoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g. indanyl, tetrahydronaphthyl, and the like). Aryl groups may be substituted or unsubstituted.

Heteroaryl groups are aromatic ring compounds containing 5 or more ring members, of which, one or more is a heteroatom such as, but not limited to, N, P, O, and S. Unless expressly indicated otherwise, heteroaryl groups may be substituted or unsubstituted. Heteroaryl groups include, but are not limited to, groups such as pyrrolyl, pyrazolyl, triazolyl, tetrazolyl, oxazolyl, isoxazolyl, thiazolyl, pyridyl, pyridazinyl, pyrimidinyl, pyrazinyl, thiophenyl, benzothiophenyl, furanyl, benzofuranyl, indolyl, azaindolyl (pyrrolopyridyl), indazolyl, benzimidazolyl, imidazopyridyl (azabenzimidazolyl), pyrazolopyridyl, triazolopyridyl, benzotriazolyl, benzoxazolyl, benzothiazolyl, benzothiadiazolyl, imidazopyridyl, isoxazolopyridyl, thianaphthalenyl, purinyl, xanthinyl, adeninyl, guaninyl, quinolinyl, isoquinolinyl, tetrahydroquinolinyl, quinoxalinyl, and quinazolinyl groups.

Heterocyclic groups includes non-aromatic ring compounds containing 3 or more ring members, of which one or more is a heteroatom such as, but not limited to, N, O, and S. In some embodiments, heterocyclic groups include 3 to 20 ring members, whereas other such groups have 3 to 6, 3 to 10, 3 to 12, or 3 to 15 ring members. Heterocyclic groups encompass unsaturated, partially saturated and saturated ring systems, such as, for example, imidazolyl, imidazolinyl and imidazolidinyl groups. Unless expressly indicated otherwise, heterocyclic groups may be substituted or unsubstituted. Heterocyclic groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazoiinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyi, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzoditheinyl, benzoatheinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyi, quinazolinyl, cinnolinyl, phthalazinyl, naphthyridinyl, pteridinyl, thianaphthalenyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyi, tetrahydropyrazolopyridyl, tetrahydroimidazopyridyl, tetrahydrotriazolopyridyl, and tetrahydroquinolinyl groups. Representative substituted heterocyclic groups may be mono-substituted or substituted more than once, such as, but not limited to, pyridyl or morpholinyl groups, which are 2-, 3-, 4-, 5-, or 6-substituted, or disubstituted with various substituents such as those listed above.

As set forth above, the composition includes the polycarbodiimide, and the polycarbodiimide comprises the reaction product of the diisocyanate and the monoisocyanate in the presence of the oxygen scavenger. The oxygen scavenger may be any type of oxygen scavenger known to those skilled in the art. For example, in any of the embodiments herein, the oxygen scavenger may be triphenylphosphite.

As is also set forth above, the polycarbodiimide comprises the reaction product of the diisocyanate and the monoisocyanate in the presence of the carbodiimidization catalyst.

The carbodiimidization catalyst may be any type of carbodiimidization catalyst known to those skilled in the art for producing a polycarbodiimide. Generally, the carbodiimidization catalyst is selected from the group of tertiary amides, basic metal compounds, carboxylic acid metal salts and/or non-basic organo-metallic compounds. In certain embodiments, the carbodiimidization catalyst comprises a phosphorus compound.

Specific examples of phosphorus compounds suitable for the purposes of the carbodiimidization catalyst includephospholene oxides. Suitable, non limiting examples of phospholene oxides include phospholene oxides such as 3-methyl-1-phenyl-2-phospholene oxide (MPPO), 1-phenyl-2-phospholen-1-oxide, 3-methyl-1-2-phospholen-1-oxide, 1-ethyl-2-phospholen-1-oxide, 3-methyl-1-phenyl-2-phospholen-1-oxide, 3-phospholene isomers thereof, and 3-methyl-1-ethyl-2-phospholene oxide (MEPO).

One particularly suitable phospholene oxide is MPPO, represented by the following structure:

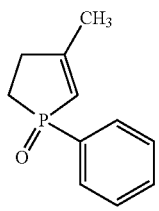

Another particularly suitable phospholene oxide is MEPO, represented by the following structure:

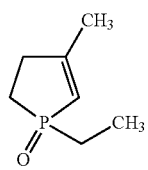

Additional examples of phosphorous compounds suitable for the purposes of the carbodiimidization catalyst include, but are not limited to, phosphates, diaza- and oxaza phospholenes and phosphorinanes. Specific examples of such phosphorous compounds include, but are not limited to, phosphate esters and other phosphates such as trimethyl phosphate, triethyl phosphate, tributyl phosphate, tri-2-ethylhexyl phosphate, tributoxyethyl phosphate, trioleyl phosphate, triphenyl phosphate, tricresyl phosphate, trixylenyl phosphate, cresyl diphenyl phosphate, xylenyl diphenyl phosphate, 2-ethylhexyldiphenyl phosphate, and the like; acidic phosphates such as methyl acid phosphate, ethyl acid phosphate, isopropyl acid phosphate, butyl acid phosphate, 2-ethylhexyl acid phosphate, isodecyl acid phosphate, lauryl acid phosphate, isotridecyl acid phosphate, myristyl acid phosphate, isostearyl acid phosphate, oleyl acid phosphate, and the like; tertiary phosphites such as triphenyl phosphite, tri(p-cresyl) phosphite, tris(nonylphenyl) phosphite, triisooctyl phosphite, diphenyisodecyl phosphite, phenyldiisodecyl phosphite, triisodecyl phosphite, tristearyl phosphite, trioleyl phosphite, and the like; secondary phosphites such as di-2-ethylhexyl hydrogen phosphite, dilauryl hydrogen phosphite, dioleyl hydrogen phosphite, and the like; and phosphine oxides, such as triethylphosphine oxide, tributylphosphine oxide, triphenylphosphine oxide, tris(chloromethyl)phosphine oxide, tris(chloromethyl)phosphine oxide, and the like. Carbodiimidization catalysts comprising phosphate esters and methods for their preparation are described in U.S. Pat. No. 3,056,835, which is hereby incorporated by reference in its entirety.

Yet further examples the carbodiimidization catalyst include, but are not limited to, 1-phenyl-3-methyl phospholene oxide, 1-benzyl-3-methyl phospholene oxide, 1-ethyl-3-methyl phospholene oxide, 1-phenyl-3-methyl phospholene dichloride, 1-benzyl-3-methyl phospholene dichloride, 1-ethyl-3-methyl phospholene dichloride, 1-phenyl-3-methyl phospholene sulphide, 1-phenyl-3-methyl phospholene sulphide, 1-benzyl-3-methyl phospholene sulphide, 1-ethyl-3-methyl phospholene sulphide, 1-phenyl-1-phenylimino-3-methyl phospholene oxide, 1-benzyl-1-phenylimino-3-methyl phospholene oxide 1-ethyl-1-phenylimino-3-methyl phospholene oxide, 1-phenyl phospholidine, 1-benzyl phospholidine, 1-ethyl phospholidine, and 1-phenyl-3-methyl phospholene oxide.

The carbodiimidization catalyst may alternatively comprise diaza and oxaza phospholenes and phosphorinanes. Diaza and oxaza phospholenes and phosphorinanes and methods for their preparation are described in U.S. Pat. No. 3,522,303, which is hereby incorporated by reference in its entirety. Specific diaza- and oxaza phospholenes and phosphorinanes include, but are not limited to, 2-ethyl-1,3-dimethyl-1,3,2-diazaphospholane-2-oxide; 2-chloromethyl-1,3-dimethyl-1,3,2-diazaphospholane-2-oxide; 2-trichloromethyl-1,3-dimethyl-1,3,2-diazaphospholane-2-oxide; 2-phenyl-1,3-dimethyl-1,3,2-diazaphospholane-2-oxide; 2-phenyl-1,3-dimethyl-1,3,2-diaza-phosphorinane-2-oxide; 2-benzyl-1,3-dimethyl-1,3,2-diazaphospholane-2-oxide; 2-allyl-1,3-dimethyl-1,3,2-diazaphospholane-2- oxide; 2-bromomethyl-1,3-dimethyl-1,3,2-diazaphospholane-2-oxide; 2-cyclohexyl-1,3-dimethyl-1,3,2-diazaphospholane-2-oxide; 2-cyclohexyl-1,3-dimethyl-1,3,2-diaphospholane-2-oxide; 2-(2-ethoxyethyl1,3-dimethyl-1,3,2-diazaphospholane-2-oxide; and 2-naphthyl-1,3-dimethyl-1,3,2-diazaphospholane-2-oxide, triethyl phosphate, hexamethyl phosphoramide, and the like.

The carbodiimidization catalyst may comprise a triaryl arsine. Triaryl arsines and methods for their preparation are described in U.S. Pat. No. 3,406,198, which is hereby incorporated by reference in its entirety. Specific examples of triaryl arsines include, but are not limited to, triphenylarsine, tris(p-tolyl)arsine, tris(p-methoxyphenyl)arsine, tris(p-ethoxyphenyl)arsine, tris(p-chlorophenyl)arsine, tris(p-fluorophenyl)arsine, tris(2,5-xylyl)arsine, tris(p-cyanophenyl) arsine, tris(1-naphthyl)arsine, tris(p-methylmercaptophenyl) arsine, tris(p-biphenylyl)arsine, p-chlorophenyl bis(ptolyl) arsine, phenyl(p-chlorophenyl)(p-bromophenyl)arsine, and the like. Additional arsine compounds are described in U.S. Pat. No. 4,143,063, which is hereby incorporated by reference in its entirety. Specific examples of such arsine compounds include, but are not limited to, triphenylarsine oxide, triethylarsine oxide, polymer bound arsine oxide, and the like.

Further, the carbodiimidization catalyst may comprise metallic derivatives of acetylacetone. Metallic derivatives of acetylacetone and methods are described in U.S. Pat. No. 3,152,131, which is hereby incorporated by reference in its entirety. Specific examples of metallic derivatives of acetylacetone include, but are not limited to, metallic derivatives of acetylacetone such as the beryllium, aluminum, zirconium, chromium, and iron derivatives.

Additional examples of the carbodiimidization catalyst include metal complexes derived from a d-group transition element and π-bonding ligand selected from the group consisting of carbon monoxide, nitric oxide, hydrocarbylisocyanides, trihydrocarbylphosphine, trihydrocarbylarsine, trihydrocarbylstilbine, and dihydrocarbylsulfide wherein hydrocarbyl in each instance contains from 1 to 12 carbon atoms, inclusive, provided that at least one of the π-bonding ligands in the complex is carbon monoxide or hydrocarbylisocyanide. Such metal complexes and methods for preparation are described in U.S. Pat. No. 3,406,197, which is hereby incorporated by reference in its entirety. Specific examples of metal complexes include, but are not limited to, iron pentacarbonyl, di-iron pentacarbonyl, tungsten hexacarbonyl, molybdenum hexacarbonyl, chromium hexacarbonyl, dimanganese decacarbonyl, nickel tetracarbonyl, ruthenium pentacarbonyl, the complex of iron tetracarbonyl: methylisocyanide, and the like.

The carbodiimidization catalyst may comprise organotin compounds. Specific examples of organotin compounds include, but are not limited to, dibutytin dilaurate, dibutyltin diacetate, dibutyltin di(2-ethylhexanoate), dioctyltin dilaurate, dibutylin maleate, di(n-octyl)tin maleate, bis(dibuty-lacetoxytin) oxide, bis(dibutyllauroyloxytin) oxide, dibutyltin dibutoxide, dibutyltin dimethoxide, dibutyltin disalicilate, dibutyltin bis(isooctylmaleate), dibutyltin bis(isopropylmaleate), dibutyltin oxide, tributyltin acetate, tributyltin isopropyl succinate, tributyltin linoleate, tributyltin nicotinate, dimethyltin dilaurate, dimethyltin oxide, diotyltin oxide, bis(tributyltin) oxide, diphenyltin oxide, triphenyltin acetate, tri-n-propyltin acetate, tri-n-propyltin laurate and bis(tri-n-propyltin) oxide, dibutyltin dilauryl mercaptide, dibutyltin bis(isooctylmercaptoacetate), bis(triphenyltin)oxide, stannous oxalate, stannous oleate, stannous naphthenate, stannous acetate, stannous butyrate, stannous 2-ethylhexanoate, stannous laurate, stannous palmitate, stannous stearate, and the like. Exemplary organotin compounds include, but are not limited to, stannous oxalate, stannous oleate and stannous 2-ethylhexanoate, dibutyltin diacetate, dibutyltin dilaurate, dibutyltin dilaurylmercaptide, dibutyltin bis(isooctylmercaptoacetate), dibutyltin oxide, bis(triphenyltin) oxide, and bis(tri-n-butyltin) oxide.

Further, the carbodiimidization catalyst may comprise various organic and metal carbene complexes, titanium(IV) complexes, copper(I) and/or copper(II) complexes.

In any of the above embodiments, the carbodiimidization catalyst may be phospholene oxide, or any of the carbodiimidization catalysts described in U.S. Pat. No. 6,489,503, incorporated herein by reference.

As is also set forth above, the capped polycarbodiimide comprises the reaction product of the diisocyanate and the monoisocyanate in the absence of solvent, or other solvent-type monomers. In various embodiments, "in the absence of solvent" is defined as the formation of the solvent in an amount of less than about 2, alternatively less than about 1, alternatively less than about 0.5, alternatively less than about 0.25, alternatively less than about 0.1, alternatively 0, parts by weight based on the total weight of the components (e.g. the monoisocyanate, the diisocyanate, etc.) used to form the capped polycarbodiimide.

Non-limiting examples of solvents include, but are not limited to, organic solvents such as acetone, benzene, toluene, ethers, acetates, volatile organic solvents, and combinations thereof. Exemplary solvents include, but are not limited to, acetone, benzene, toluene, methylene chloride, chloroform, trichloroethylene, hexachloroethylene, carbon tetrachloride, xylene, ethyl acetate, butyl acetate, or the like. In some embodiments, the polycarbodiimide is formed in the absence of "solvent" monomers. Such solvent monomers include, but not limited to, styrene, methylstyrene, vinyl alcohol, vinyl esters, glycols, glycol esters, amides, and vinyl amides.

In various embodiments, the diisocyanate and the monoisocyanate may be reacted in an inert atmosphere, i.e., an atmosphere substantially free from oxygen. Any inert atmosphere known in the art may be utilized during the step of polymerizing the isocyanate component. The inert atmosphere may include an inert gas, such as nitrogen, argon, helium, and carbon dioxide, etc.

From a chemical reaction standpoint, the polycarbodiimide may be prepared according to the reaction described in Scheme 1 below:

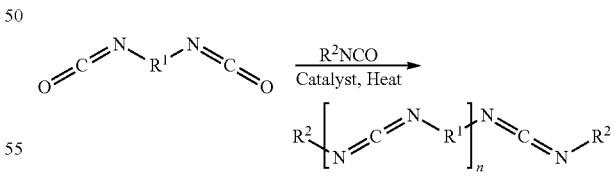

In the reaction described in Scheme 1, the polycarbodiimide is prepared in process that includes combining a diisocyanate, an oxygen scavenger, a monoisocyanate, and a carbodiimidization catalyst to form a reaction mixture. The reaction mixture is then heated to a temperature and for a time sufficient to form the polycarbodiimide. The process produces a polycarbodiimide having 0.25 wt. % or less, alternatively 0.1 wt. % or less, of free isocyanate groups. Further, steps of combining and heating are conducted in the absence of a solvent.

As readily understood in the art, carbon dioxide gas is released during the step of polymerizing the isocyanate component. Specifically, carbon dioxide is a by-product formed when isocyanate (—N=C=O) groups present in the isocyanate component react with one another to form carbodiimide linkages (—N=C=N—).

During the process of forming the polycarbodiimide, the diisocyanate, the monoisocyanate, the oxygen scavenger, and the carbodiimidization catalyst may be added to a reactor all together or in any order. In one embodiment, the diisocyanate, the monoisocyanate, and the oxygen scavenger are combined and heated prior to addition of the carbodiimidization catalyst. Once formed, the reaction mixture may be heated to a temperature of from about 30 to about 200, alternatively from about 60 to about 120, alternatively from about 100 to about 110, ° C. for a time of from about 2 hours to about 48 hours, alternatively from about 4 hours to about 20 hours, alternatively from about 4 hours to about 14 hours.

In Scheme 1, $R^1$ is a linking group, which in the diisocyanate is the group on which the isocyanates are located. Also included in the reaction mixture is a monoisocyanate ($R^2$NCO) that results in the end groups capping the polycarbodiimide.

$R^1$ and $R^2$ may individually be alkyl, cycloalkyl, aromatic, heterocyclic, or heteroaryl groups. In some embodiments of the above compounds, $R^1$ and $R^2$ may individually be $C_1$-$C_{12}$ alkyl, $C_1$-$C_{12}$ cycloalkyl, a $C_6$-$C_{12}$ aromatic, a $C_6$-$C_{12}$ heterocyclic, or a $C_6$-$C_{12}$ heteroaryl group. For example, $R^1$ and $R^2$ may individually be a methylene, ethylene, propylene, isopropylene, butylene, pentylene, hexylene, heptylene, octylene, nonylene, decalinylene, dodecylene, 1,2-cyclohexylene, 1,3-cyclohexylene, 1,4-cyclohexylene, 1,2-phenylene, 1,3-phenylene, 1,4-phenylene, tolyl, 1,5-naphtyl, isophorone, or 1,3-xylyl. In some embodiments, $R^1$ and $R^2$ are a methyl, an ethyl, a propyl isopropyl, a butyl, a pentyl hexyl, a heptyl, an octyl, a nonyl, a decalinyl, a dodecyl, a cyclohexyl, a phenyl, or a tolyl group. In some preferred embodiments, $R^1$ is an aryl group. For example, $R^1$ may preferably be phenyl, tolyl, or xylyl. In other preferred embodiments, $R^2$ is an aryl group. For example, $R^2$ may preferably be phenyl, tolyl, or xylyl. Of course, $R^1$ and $R^2$ can be the same or different.

Exemplary diisocyantes that may be used in forming the polycarbodiimide include, but are not limited to: m-phenylene diisocyanate; 2,4-toluene diisocyanate; 2,6-toluene diisocyanate; hexamethylene diisocyanate; 1,4-phenylene diisocyanate; tetramethylene diisocyanate; cyclohexane-1,4-diisocyanate; hexahydrotoluene diisocyanate; methylenediisocyanate; 2,6-diisopropylphenyl isocyanate; m-xylylene diisocyanate; dodecyl isocyanate; 3,3'-dichloro-4,4'-diisocyanato-1,1'-biphenyl; 1,6-diisocyanato-2,2,4-trimethylhexane; 3,3'-dimethoxy-4,4'-biphenylene diisocyanate; 2,2-diisocyanatopropane; 1,3-diisocyanatopropane; 1,4-diisocyanatobutane; 1,5-diisocyanatopentane; 1,6-diisocyanatohexane; 2,3-diisocyanatotoluene; 2,4-diisocyanatotoluene; 2,5-diisocyanatotoluene; 2,6-diisocyanatotoluene; isophorone diisocyanate; hydrogenated methylene bis(phenylisocyanate); naphthalene-1,5-diisocyanate; 1-methoxyphenyl-2,4-diisocyanate; 1,4-diisocyanatobutane; 4,4'-biphenylene diisocyanate; 3,3'-dimethyldiphenylmethane-4,4'-diisocyanate; 4,4',4"-triphenylmethane triisocyanate; toluene-2,4,6-triisocyanate; 4,4'-dimethyldiphenylmethane-2,2',5,5'-tetraisocyanate; polymethylene polyphenylene polyisocyanate; or a mixture of any two or more thereof. In a preferred embodiment, the diisocyanate is 2,4-toluene diisocyanate, 2,6-toluene diisocyanate, or a mixture of 2,4- and 2,6-toluene diisocyanate. In one embodiment, the diisocyanate includes 100% 2,4-toluene diisocyanate. In another embodiment, the diisocyanate includes about 80% 2,4-toluene diisocyanate and about 20% 2,6-toluene diisocyanate. In another embodiment, the diisocyanate includes about 65% 2,4-toluene diisocyanate and about 35% 2,6-toluene diisocyanate.

Exemplary monoisocyanates that may be used in forming the polycarbodiimide include, but are not limited to: chlorosulfonyl isocyanate; trichloromethyl isocyanate; trichloroacetyl isocyanate; trichloroacetyl isocyanate; chloroacetyl isocyanate; vinyl isocyanate; methyl isocyanatoformate; 2-bromoethyl isocyanate; 2-chloroethyl isocyanate; 2-chloroethyl isocyanate; ethyl isocyanate; isocyanato(methoxy) methane; allyl isocyanate; ethyl isocyanatoformate; 3-chloropropyl isocyanate; isopropyl isocyanate; propyl isocyanate; (trimethylsilyl)isocyanate; isocyanatocyclobutane; ethyl isocyanatoacetate; methyl (2s)-2-isocyanatopropanoate; butyl isocyanate; tert-butyl isocyanate; 1,1-dimethoxy-2-isocyanatoethane; cyclopentyl isocyanate; 2-isocyanato-2-methyl-propionic acid methyl ester; ethyl 3-isocyanatopropionate; (r)-(–)-3-methyl-2-butyl isocyanate; 1-isocyanato-2,2-dimethylpropane; 1-isocyanato-3-methylbutane; 3-isocyanatopcntane; pentyl isocyanate; 1-ethoxy-3-isocyanatopropane; pentafluorophenyl isocyanate; 4-bromo-2,6-difluorophenyl isocyanate; 2,4,6-tribromophenyl isocyanate; 2,3,4-trifluorophenyl isocyanate; 2,4,5-trifluorophenyl isocyanate; 4-bromo-1-chloro-2-isocyanatobenzene; 4-bromo-2-fluorophenyl isocyanate; 1-chloro-3-fluoro-2-isocyanatobenzene; 2-chloro-3-fluorophenylisocyanate; 3-chloro-4-fluorophenyl isocyanate; 4-chloro-2-fluorophenyl isocyanate; 5-chloro-2-nitrophenyl isocyanate; 2,4-dichlorophenyl isocyanate; 2,6-dichlorophenyl isocyanate; 3,4-dichlorophenyl isocyanate; 3,5-dichlorophenyl isocyanate; 2-fluoro-4-iodophenyl isocyanate; 4-fluoro-2-nitrophenyl isocyanate; 2,4-difluorophenyl isocyanate; 2,4-difluorophenyl isocyanate; 2,5-difluorophenyl isocyanate; 2,6-difluorophenyl isocyanate; 3,4-difluorophenyl isocyanate; 3,5-difluorophenyl isocyanate; 2,1,3-benzothiadiazol-4-yl isocyanate; 3,5-dinitrophenyl isocyanate; 3,5-dinitrophenyl isocyanate; 2-bromophenyl isocyanate; 3-bromophenyl isocyanate; 4-bromophenyl isocyanate; 2-chlorophenyl isocyanate; 3-chlorophenyl isocyanate; 3-chlorophenyl isocyanate; 4-chlorophenyl isocyanate; 2-chlorobenzenesulfonyl isocyanate; 4-(chlorosulfonyl)phenyl isocyanate; 4-chlorobenzenesulfonyl isocyanate; 2-fluorophenyl isocyanate; 3-fluorophenyl isocyanate; 4-fluorophenyl isocyanate; 4-fluorobenzenesulfonyl isocyanate; 2-iodophenyl isocyanate; 3-iodophenyl isocyanate; 4-iodophenyl isocyanate; 2-nitrophenyl isocyanate; 3-nitrophenyl isocyanate; 4-nitrophenyl isocyanate; phenyl isocyanate; phenyl isocyanate; benzenesulfonyl isocyanate; 2-isocyanatoethyl methacrylate; (isocyanatomethyl)cyclopentane; cyclohexyl isocyanate; 2-isocyanato-3-methyl-butyric acid methyl ester; butyl isocyanatoacetate; ethyl 4-isocyanatobutyrate; methyl (2s)-2-isocyanato-4-(methylsulfanyl)butanoate; hexyl isocyanate; 4-bromo-2-(trifluoromethyl)phenyl isocyanate; 2-chloro-4-(trlfluoromethyl)phenyl isocyanate; 2-chloro-6-(trifluoromethyl)phenyl isocyanate; 4-chloro-3-(trifluoromethyl)phenyl isocyanate; 5-chloro-2-isocyanatobenzonitrile; 5-fluoro-2-isocyanatobenzonitrile; 2-fluoro-3-(trifluoromethyl)phenyl isocyanate; 2-fluoro-5-(trifluoromethyl)phenyl isocyanate; 3-fluoro-5-(trifluoromethyl)phenyl isocyanate; 4-fluoro-2-(trifluoromethyl)phenyl isocyanate; 4-fluoro-3-(trifluoromethyl)phenyl isocyanate; 3-isocyanatobenzoyl chloride; 4-isocyanatobenzoyl chloride; 2-(trifluoromethyl)

phenyl isocyanate; 3-(trifluoromethyl)phenyl isocyanate; 4-(trifluoromethyl)phenyl isocyanate; 4-(trifluoromethylthio)phenyl isocyanate; 2-(trifluoromethoxy)phenyl isocyanate; 4-(trifluoromethoxy)phenyl isocyanate; 3-cyanophenyl isocyanate; 4-cyanophenyl isocyanate; 4-bromo-2-chloro-6-methylphenyl isocyanate; 2,4-dichlorobenzyl isocyanate; 3,4-dichlorobenzyl isocyanate; 2-(difluoromethoxy)phenyl isocyanate; 4-(difluoromethoxy)phenyl isocyanate; benzoyl isocyanate; 3,4-(methylenedioxy)phenyl isocyanate; phenyl isocyanatoformate; 4-bromo-3-methylphenylisocyanate; 4-bromobenzyl isocyanate; 2-(chloromethyl)phenyl isocyanate; 2-chloro-5-methylphenyl isocyanate; 2-chloro-6-methylphenyl isocyanate; 2-chlorobenzyl isocyanate; 3-chloro-2-methylphenyl isocyanate; 3-chloro-4-methylphenyl isocyanate; 4-(chloromethyl)phenyl isocyanate; 4-chlorobenzyl isocyanate; 5-chloro-2-methylphenyl isocyanate; 5-chloro-2-methoxyphenyl isocyanate; 2-fluoro-5-methylphenyl isocyanate; 2-fluorobenzyl isocyanate; 3-fluoro-2-methylphenyl isocyanate; 3-fluoro-4-methylphenyl isocyanate; 3-fluorobenzyl isocyanate; 4-fluoro-3-methylphenyl isocyanate; 4-fluorobenzylisocyanate; 5-fluoro-2-methylphenyl isocyanate; 4-fluorobenzyl isothiocyanate; 2-methyl-3-nitrophenyl isocyanate; 2-methyl-4-nitrophenyl isocyanate; 4-methyl-2-nitrophenyl isocyanate; 5-methyl-2-nitrophenyl isocyanate; 2-methoxy-4-nitrophenyl isocyanate; 4-methoxy-2-nitrophenyl isocyanate; benzyl isocyanate; m-tolyl isocyanate; o-tolyl isocyanate; p-tolyl isocyanate; 2-methoxyphenyl isocyanate; 3-methoxyphenyl isocyanate; 4-methoxyphenyl isocyanate; o-toluenesulfonyl isocyanate; p-toluenesulfonyl isocyanate; cycioheptyl isocyanate; cyclohexanemethyl isocyanate; 6-isocyanatohexanoic acid methyl ester; methyl (2s)-2-isocyanato-4-methylpentanoate; ethyl 2-isocyanato-4-(methylthio) butyrate; (r)-(–)-2-heptyl isocyanate; (s)-(+)-2-heptyl isocyanate; heptyl isocyanate; 3,5-bis(trifluoromethyl)phenyl isocyanate; 2-isocyanato-5-methylbenzonitrile; 4-isocyanatobenzyl cyanide; 2,4-dichlorophenethyl isocyanate; 3,4-dichlorophenethyl isocyanate; 4-acetylphenyl isocyanate; methyl 2-isocyanatobenzoate; methyl 3-isocyanatobenzoate; methyl 4-isocyanatobenzoate; (s)-(–)-1-(4-bromophenyl)ethyl isocyanate; 4-bromo-2,6-dimethylphenyl isocyanate; 4-bromo-2-ethylphenyl isocyanate; (r)-(+)-1-(4-chlorophenyl)ethyl isocyanate; 3-chlorophenethyl isocyanate; 4-chlorophenethyl isocyanate; (r)-(+)-1-(4-iluorophenyl)ethyl isocyanate; (s)-(–)-1-(4-fluorophenyl)ethyl isocyanate; 2-fluorophenethyl isocyanate; 4-fluorophenethyl isocyanate; 2,3-dimethyl-6-nitrophenyl isocyanate; 4-ethoxy-2-nitrophenyl isocyanate; 2,5-dimethylphenyl isocyanate; 2,6-dimethylphenyl isocyanate; 2-methylbenzyl isocyanate; 3,5-dimethylphenyl isocyanate; 3-methylbenzyl isocyanate; 4-ethylphenyl isocyanate; 4-methylbenzyl isocyanate; phenethyl isocyanate; 2-methoxy-5-methylphenyl isocyanate; 2-methoxybenzyl isocyanate; 3-ethoxyphenyl isocyanate; 3-methoxybenzyl isocyanate; 4-methoxybenzyl isocyanate; 1-isocyanato-2,3-dimethoxybenzene; 2,4-dimethoxyphenyl isocyanate; 2,5-dimethoxyphenyl isocyanate; 2,6-dimethoxyphenyl isocyanate; 3,4-dimethoxyphenyl isocyanate; 3,5-dimethoxyphenyl isocyanate; 4-(dimethylamino)phenyl isocyanate; ethyl 2-isocyanato-4-methylvalerate; ethyl 6-isocyanatohexanoate; (r)-(–)-2-octyl isocyanate; (s)-(+)-2-octyl isocyanate; 1,1,3,3-tetramethylbutyl isocyanate; 2-ethylhexyl isocyanate; octyl isocyanate; 5-ethyl-2-isocyanatobenzonitrile; (s)-(+)-1-indanyl isocyanate; 5-indanyl isocyanate; trans-2-phenylcyclopropyl isocyanate; 3,4-methylenedioxyphenethyl isocyanate; ethyl 2-isocyanatobenzoate; ethyl 3-isocyanatobenzoate; ethyl 4-isocyanatobenzoate; methyl 3-isocyanato-2-methylbenzoate; 3-bromo-2,4,6-trimethylphenyl isocyanate; (r)-(+)-1-phenylpropyl isocyanate; (s)-(–)-1-phenylpropyl isocyanate; 2-ethyl-6-methylphenyl isocyanate; 3-phenylpropyl isocyanate; (r)-(+)-1-(3-methoxyphenyl)ethyl isocyanate; (r)-(+)-1-(4-methoxyphenyl)ethyl isocyanate; (s)-(–)-1-(3-methoxyphenyl)ethyl isocyanate; 1-ethoxy-4-isocyanato-2-methoxybenzene; 2,4-dimethoxybenzyl isocyanate; 3,4,5-trimethoxyphenyl isocyanate; (r)-(–)-2-nonyl isocyanate; (s)-(+)-2-nonyl isocyanate; 1-naphthyl isocyanate; 2-naphthyl isocyanate; dimethyl 2-isocyanatoterephthalate; dimethyl 5-isocyanatoisophthalate; 1-isocyanato-1,2,3,4-tetrahydronaphthalene; ethyl (4-isocyanatophenyl)acetate; 2,6-diethylphenyl isocyanate; 4-butylphenyl isocyanate; 4-ethylphenethyl isocyanate; 4-phenylbutyl isocyanate; 4-sec-butylphenyl isocyanate; 4-tert-butylphenyl isocyanate; 2,3-dimethoxyphenethyl isocyanate; 2,5-dimethoxyphenethyl isocyanate; 3,4-dimethoxyphenethyl isocyanate; 3,4,5-trimethoxybenzyl isocyanate; 1-adamantyl isocyanate; ethyl 4-(isocyanatomethyl) cyclohexanecarboxylate; decyl isocyanate; 8-(isocyanatomethyl)-6h-[1,3]dioxolo[4,5-g]chromen-6-one; 2-ethyl-6-isopropylphenyl isocyanate; 4-butyl-2-methylphenyl isocyanate; 4-pentylpheny]isocyanate; undecyl isocyanate; 4-chloro-2-phenoxyphenyl isocyanate; 5-chlofo-2-phenoxyphenyl isocyanate; 2-biphenylyl isocyanate; 4-biphenylyl isocyanate; 3-phenoxyphenyl isocyanate; 4-phenoxyphenyl isocyanate; p-phenylazophenyl isocyanate; 1-(1-naphthyl)ethyl isocyanate; (1r,2r)-(–)-2-benzyloxycyclopentyl isocyanate; 4,4'-oxybis(phenyl isocyanate); 9h-fluoren-2-yl isocyanate; 9h-fluoren-9-yl isocyanate; 4-isocyanatobenzophenone; 2-benzylphenyl isocyanate; 4-benzylphenyl isocyanate; diphenylmethyl isocyanate; 4-(benzyloxy)phenyl isocyanate; (1r,2r)-(–)-2-benzyloxycyclohexyl isocyanate; (1s,2s)-(+)-2-benzyloxycyclohexyl isocyanate; 2,2-diphenylethyl isocyanate; 2-(4-biphenyl)ethyl isocyanate; 4'-isocyanatobenzo-15-crown-5; 2,5-di-tert-butylphenyl isocyanate; tetradecyl isocyanate; n-frnoc-isocyanate; 3,3-diphenylpropyl isocyanate; 2,2-bis(4-isocyanatophenyl)hexafluoropropane; hexadecyl isocyanate; or octadecyl isocyanate. In one embodiment, the monoisocyanate is an aromatic isocyanate. Mixtures of any two or more monoisocyanates may also be used.

In one embodiment, the diisocyanate is selected from 2,4-toluene diisocyanate, 2,6-toluene diisocyanate, and combinations thereof, and the monoisocyanate is an aromatic monoisocyanate. For example, from a chemical reaction standpoint, the polycarbodiimide may be prepared according to the reaction described in Scheme 2 below:

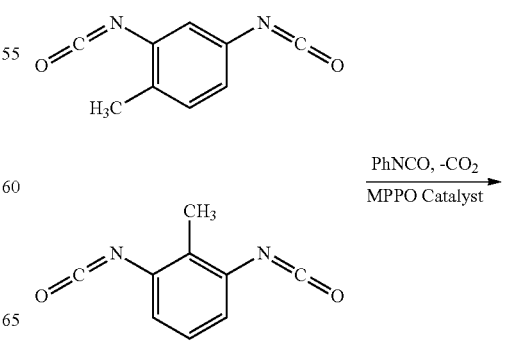

-continued

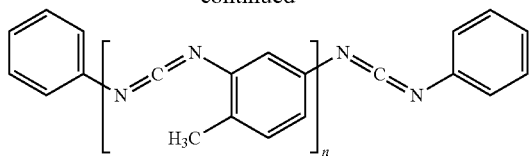

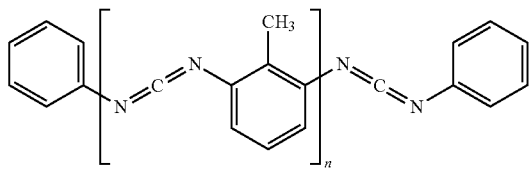

Suitable isocyanates are commercially available from BASF Corporation of Florham Park, N.J. under the trade name LUPRANATE®.

In various embodiments, the capped polycarbodiimide has the following formula:

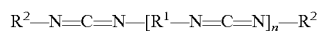

wherein each $R^1$ is independently an alkyl, cycloalkyl, aromatic, heterocyclic, or heteroaryl group, each $R^2$ is independently an alkyl, cycloalkyl, aromatic, heterocyclic, or heteroaryl group, and n is an integer from 1 to 100.

In the capped polycarbodiimide, $R^1$ is a linking group formed from the diisocyanate, and $R^2$ is an end cap formed from a monoisocyanate. In various embodiments, the linking group is alkyl, cycloalkyl, aromatic, heterocyclic, or heteroaryl. Illustrative examples of $R^1$ and $R^2$ include, but are not limited to, methylene, ethylene, propylene, isopropylene, butylene, pentylene, hexylene, heptylene, octylene, nonylene, decalinylene, dodecylene, 1,2-cyclohexylene, 1,3-cyclohexylene, 1,4-cyclohexylene, 1,2-phenylene, 1,3-phenylene, 1,4-phenylene, a tolyl, or a xylyl.

In some of these embodiments, $R^2$ may be a $C_1$-$C_{12}$ alkyl, $C_1$-$C_{12}$ cycloalkyl, a $C_6$-$C_{12}$ aromatic, a $C_6$-$C_{12}$ heterocyclic, or a $C_6$-$C_{12}$ heteroaryl. For example, $R^2$ may be a methyl, an ethyl, a propyl isopropyl, a butyl, a pentyl hexyl, a heptyl, an octyl, a nonyl, a decalinyl, a dodecyl, a cyclohexyl, a phenyl, or a tolyl group. In some preferred embodiments, $R^2$ is an aromatic group. For example, in some embodiments, the monoisocyanate is an aromatic isocyanate is 1,3-phenylene, 1,4-phenylene, a tolyl, or a xylyl group.

In some of these embodiments, $R^1$ may be a $C_1$-$C_{12}$ alkyl, $C_1$-$C_{12}$ cycloalkyl, a $C_6$-$C_{12}$ aromatic, a $C_6$-$C_{12}$ heterocyclic, or a $C_6$-$C_{12}$ heteroaryl group. For example, $R^1$ may be a methylene, an ethylene, a propylene, an isopropylene, a butylene, a pentylene, a hexylene, a heptylene, an octylene, a nonylene, a decalinylene, a dodecylene, a 1,2-cyclohexylene, a 1,3-cyclohexylene, a 1,4-cyclohexylene, a 1,2-phenylene, a 1,3-phenylene, a 1,4-phenylene, or an tolyl group. In some preferred embodiments, $R^1$ is an arylene group. For example, in some embodiments, $R^1$ is 1,3-phenylene, 1,4-phenylene, a tolyl, or a xylyl group.

In one particular embodiment, $R^2$ is phenyl or tolyl group and $R^1$ is 1,2-phenylene, 1,3-phenylene, 1,4-phenylene, or tolyl group.

In any of the above embodiments, the polycarbodiimide may have a weight average molecular weight of from about 300 to about 30,000, alternatively from about 300 to about 20,000, alternatively from about 300 to about 10,000, alternatively from about 300 to about 2,500, g/mol.

Furthermore, the polycarbodiimide is made by a process such that it lacks residual isocyanate (NCO) groups, or at least has a very high percentage of —N═C═N— linkages in comparison to residual NCO groups. The polycarbodiimide has less than about 0.25, alternatively less than about 0.1, alternatively less than about 0.075, wt. % free NCO groups. In some embodiments, the polycarbodiimide has no free NCO groups, e.g. in some embodiments any remaining NCO groups are so few as to be undetectable by infra-red spectroscopy.

The polycarbodiimide has a long pot-life. For example, the pot-life of the polycarbodiimide may be greater than about 0.5, alternatively greater than about 1, alternatively greater than about 1.5, alternatively greater than about 2.0, year(s). As used herein, the term "pot-life" indicates that the polycarbodiimide maintains a molecular weight, flowability, and reactivity over the described time period at room temperature. In the above example of the pot-life of greater than about 0.5 years, this includes, but is not limited to, pot-lives of at least about 12 months, about 16 months, about 18 months, about 2 years, about 30 months, about 3 years, about 42 months, about 4 years, so on and so forth.

The polycarbodiimide may be included in the composition in an amount of from about 5 to about 95, alternatively from about 15 to about 95, alternatively from about 5 to about 50, alternatively from about 10 to about 30, alternatively from about 50 to about 97, alternatively from about 80 to about 95, wt. % based on the total weight of the composition. Specifically, the polycarbodiimide and the polyol, respectively, may be included in the composition in an equivalence ratio of from about 1:20 to about 20:1, alternatively from about 1:10 to about 10:1, alternatively from about 1:5 to about 5:1, alternatively from about 1:2 to about 2:1, alternatively from about 1:2 to about 2:1, alternatively from about 1:2 to about 5:1, alternatively from about 1:5 to about 2:1. The amount of polycarbodiimide may vary outside of the ranges above, but is typically both whole and fractional values within these ranges. Further, it is to be appreciated that more than one polycarbodiimide may be included in the composition, in which case the total amount of all the polycarbodiimide included is within the above ranges.

The composition also includes a polyol or combination of polyols. The polyol includes at least one, typically two OH functional groups. In certain embodiments, the polyol includes a polyester polyol, a polyether polyol, polyether/ester polyols, or a combination thereof. Further, the polyol can be selected from the group of, but is not limited to, aliphatic polyols, cycloaliphatic polyols, aromatic polyols, heterocyclic polyols, and combinations thereof. More specific examples of suitable polyols include, but are not limited to, polyalkylene glycols (e.g. propylene glycols), sucrose-initiated polyols, sucrose/glycerine-initiated polyols, trimethylolpropane-initiated polyols, biopolyols, graft polyols, catalytic polyols, alkoxylated polyethylenimines, tetratrahydrofurans, and combinations thereof.

Suitable polyether polyols include products obtained by the polymerization of a cyclic oxide, for example, ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof. Examples of suitable polyether polyols are commercially available from BASF Corporation of Florham Park, N.J. under the trade names of PLURACOL®.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 95% by weight, and copolymers having oxypropylene contents of from about 5 to about 100% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols include hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used. Suitable polyester polyols are commercially available from BASF Corporation of Florham Park, N.J. under the trade names of PLURACOL® and PLURONIC®.

Suitable polyesteramide polyols (catalytic) may be obtained by the inclusion of aminoalcohols such as ethanolamine in polyesterification mixtures. Suitable polythioether polyols include products obtained by condensing thiodiglycol, either alone, or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

In certain embodiments, the composition includes a natural oil polyol (NOP). In other words, the polyol is not a petroleum-based polyol, i.e., a polyol derived from petroleum products and/or petroleum by-products. In general, there are only a few naturally occurring vegetable oils that contain unreacted OH functional groups, and castor oil is typically the only commercially available NOP produced directly from a plant source that has sufficient OH functional group content to make castor oil suitable for direct use as a polyol in urethane chemistry. Most, if not all, other NOPs require chemical modification of the oils directly available from plants. The NOP is typically derived from any natural oil, typically derived from a vegetable or nut oil. Examples of suitable natural oils include castor oil, and NOPs derived from soybean oil, rapeseed oil, coconut oil, peanut oil, canola oil, etc. Employing such natural oils can be useful for reducing environmental footprints. Examples of suitable NOP's are commercially available from BASF Corporation of Florham Park, N.J. under the trade names of LUPRANOL® and SOLVERMOL®.

In certain embodiments, the composition includes a graft polyol. In one embodiment, the graft polyol is a polymer polyol. In other embodiments, the graft polyol is selected from the group of polyharnstoff (PHD) polyols, polyisocyanate polyaddition (PIPA) polyols, and combinations thereof.

Graft polyols may also be referred to in the art as graft dispersion polyols or graft polymer polyols. Graft polyols are well known to those skilled in the polyurethane art and include products, i.e., polymeric particles, obtained by the in-situ polymerization of one or more vinyl monomers, e.g. styrene monomers and/or acrylonitrile monomers, and a macromer in a polyol, e.g. a polyether polyol. In one embodiment, the composition includes a styrene-acrylonitrile graft polyol. PHD polyols are typically formed by in-situ reaction of a diisocyanate with a diamine in a polyol to give a stable dispersion of polyurea particles. PIPA polyols are similar to PHD polyols, except that the dispersion is typically formed by in-situ reaction of a diisocyanate with an alkanoamine instead of a diamine, to give a polyurethane dispersion in a polyol. It is to be appreciated that the present disclosure is not limited to any particular method of making the graft polyol. Examples of suitable graft polyols are commercially available from BASF Corporation of Florham Park, N.J. under the trade names of PLURACOL®.

In certain embodiments, the composition includes a catalytic polyol derived from an amine-based initiator. In some embodiments, the amine-based initiator is aromatic. The catalytic polyol is referred to as a "catalytic" polyol because the catalytic polyol can be used instead of a catalyst to facilitate the chemical reaction between the polycarbodiimide and the polyol component. Said differently, the catalytic polyol will typically chemically react with the polycarbodiimide to form the polyiso-urea at lower temperatures than a polyol component that does not include the catalytic polyol. As set forth above, the catalytic polyol is derived from an amine-based initiator. However, the catalytic polyol may be formed with more than one initiator. In one embodiment, the catalytic polyol is co-initiated with the amine-based initiator and dipropylene glycol. Without being bound or limited by any particular theory, it is believed that amine content of the catalytic polyol facilitates the reaction of the isocyanate with the polyol component.

The catalytic polyol typically includes alkylene oxide substituents. Examples of suitable alkylene oxides substituents include ethylene oxide, propylene oxide, butylene oxide, amylene oxide, mixtures thereof, alkylene oxide-tetrahydrofuran mixtures, and epihalohydrins. As previously described above, the catalytic polyol may be formed from an aromatic amine-based initiator. In one embodiment, the aromatic amine-based initiator is of the formula:

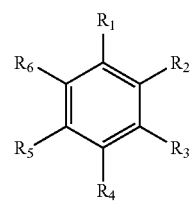

wherein $R_1$ includes one of an alkyl group, an amine group, and a hydrogen, and each of $R_2$-$R_6$ independently include one of an amine group and a hydrogen, so long as at least one of $R_1$-$R_6$ is an amine group. Therefore, it is to be understood that $R_1$ can be any one of an alkyl group, an amine group, or a hydrogen, or any compound including combinations thereof. It is also to be understood that $R_2$-$R_6$ do not have to be identical and each can include an amine group or a hydrogen. It is also to be understood that the terminology "an amine group" may refer to either R—N—H groups or $NH_2$ groups throughout.

The aromatic amine-based initiator may include, but is not limited to, a toluene diamine. Suitable examples of toluene diamine include, but are not limited to, the following formulas and mixtures thereof:

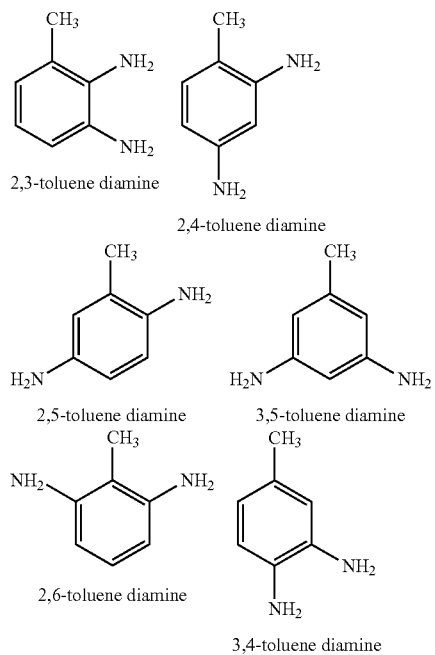

2,3-toluene diamine
2,4-toluene diamine
2,5-toluene diamine
3,5-toluene diamine
2,6-toluene diamine
3,4-toluene diamine Typically, the catalytic polyol formed from an aromatic amine-based initiator has a viscosity of from 400 to 25,000 and alternatively from 450 to 20,000, cP at 25° C. In one embodiment, the catalytic polyol has a viscosity of from 500 to 2,500, alternatively from 1,000 to 2,000, alternatively from 1,500 to 2,500, and alternatively from 1,800 to 2,000, cP at 25° C. In another embodiment, the catalytic polyol has a viscosity of from 1,000 to 10,000, alternatively from 3,000 to 8,000, and alternatively from 4,500 to 6,000, cP at 25° C. In still another embodiment, the catalytic polyol has a viscosity of from 15,000 to 25,000, alternatively from 16,000 to 20,000, and alternatively from 17,500 to 19,000, cP at 25° C. Typically, the catalytic polyol has a nominal functionality greater than 2.5, alternatively of from 2.5 to 8, alternatively from 2.5 to 4.5, and alternatively from 3.5 to 4.5. The catalytic polyol typically has an OH number of from 100 to 700, alternatively from 200 to 500, alternatively from 250 to 350, mg KOH/g. In another embodiment, the catalytic polyol has an OH number of from 350 to 450 mg KOH/g. In still another embodiment, the catalytic polyol has an OH number of from 400 to 500 mg KOH/g. Typically, the catalytic polyol has a number average molecular weight of from 240 to 2,250, alternatively from 330 to 1,120, and alternatively from 370 to 900, g/mol. The viscosity, nominal functionality, OH number, and number average molecular weight of the catalytic polyol of this embodiment may vary outside of the ranges above, but are typically both whole and fractional values within those ranges. Examples of suitable catalytic polyols are commercially available from BASF Corporation of Florham Park, N.J. under the trade PLURACOL.

Alkoxylated polyethylenimines (APEIs) are known in the art, as are methods of making APEI products including the APEIs. Among the APEIs, propoxylated polyethylenimines (PPEIs) and ethoxylated polyethylenimines (EPEIs) are most common in commercial applications. Examples of suitable APEIs are commercially available from BASF Corporation of Florham Park, N.J. under the trade LUPASOL®.

It is to be appreciated that the composition may include any combination of the aforementioned polyols.

The polyol is typically a liquid at 25° C. In any of the above embodiments, the polyol may have a weight average molecular weight of from about 300 to about 30,000, alternatively from about 300 to about 20,000, alternatively from about 300 to about 10,000, alternatively from about 300 to about 2,500, equal to or less than about 2,500, equal to or less than about 1,500, g/mol.

As set forth above, the polyol includes at least two OH functional groups. In any of the above embodiments, the polyol may have a nominal functionality of greater than about 1, alternatively greater than about 2, alternatively from about 2 to about 8, alternatively from about 2 to about 6, alternatively from about 2 to about 3.5, alternatively from about 2 to about 4, alternatively from about 2 to about 3, alternatively from about 2.5 to about 4, alternatively from about 3 to about 3.5.

The molecular weight, viscosity, and OH number of the polyol may be any value outside of the ranges above, but are typically both whole and fractional values within those ranges. Further, it is to be appreciated that more than one polyol may be included in the composition, in which case the average values for molecular weight, viscosity, and OH number of all the polyols included is within the above ranges.

The polyol may be included in the composition in an amount of from about 5 to about 95, alternatively from about 5 to about 85, alternatively from about 5 to about 50, alternatively from about 5 to about 30, alternatively from about 70 to about 90, alternatively from about 80 to about 95, wt. % based on the total weight of the composition. Specifically, the polycarbodiimide and the polyol, respectively, may be included in the composition in a equivalence ratio of from about 1:20 to about 20:1, alternatively from about 1:10 to about 10:1, alternatively from about 1:5 to about 5:1, alternatively from about 1:2 to about 2:1, alternatively from about 1:2 to about 2:1, alternatively from about 1:2 to about 5:1, alternatively from about 1:5 to about 2:1. The amount of polyol may vary outside of the ranges above, but is typically both whole and fractional values within these ranges. Further, it is to be appreciated that more than one polyol may be included in the composition, in which case the total amount of all the polyol included is within the above ranges.

In various embodiments, the composition further comprises a filler. Various non-limiting examples of filler include mineral fillers, metallic stearates, metallic carbonates, and combinations thereof. Some specific, non-limiting examples of filler include silicates, carbonates, talc, clay, aluminum trihydroxide, fly ash, barium sulfate, zeolites, fumed silica, molecular sieves, glass fibers, glass spheres, carbon black, nanoparticles, conductive particles, or combinations thereof. More specific examples of suitable fillers include metallic stearates, carbonates, silicates, and combinations thereof.

The composition may further comprise components in addition to the capped polycarbodiimide and the polyol. For example, the composition can include adhesion promoters, UV stabilizers, colorants, flame retardants, thixotropic agents, diluents, catalysts, solvents, etc.

However, the excellent properties of the composition and the polyiso-urea formed from the composition are obtainable in the absence of such further components. To this end, in various embodiments, the composition consists essentially of the capped polycarbodiimide and the polyol. In these embodiments, the composition is substantially free from additional components, i.e., such additional components are present in the composition in an amount of from less than about 1, alternatively less than about 0.5, alternatively less than about 0.25, alternatively less than about 0.1, alternatively 0, parts by weight based on the total weight of the composition.

The instant disclosure describes a composition comprising the capped polycarbodiimide and the polyol. Typically, the composition is provided as a one-component (1K) composition including two or more discrete components, such as the capped polycarbodiimide and the polyol. However, it is to be appreciated that a two-component (2K) system, e.g. including a first component comprising the polycarbodiimide and a second component comprising a polyol, has been contemplated herein. As such, the subject disclosure should not be construed as limited to only a 1K system.

In various embodiments, the composition may be described as being, including, consisting essentially of, or consisting of the capped polycarbodiimide and the polyol. In some embodiments, the composition may be described as being, including, consisting essentially of, or consisting of the polycarbodiimide and the catalytic polyol. In other embodiments, the composition may be described as being, including, consisting essentially of, or consisting of the polycarbodiimide and the polyether polyol. In yet other embodiments, the composition may be described as being, including, consisting essentially of, or consisting of the polycarbodiimide and the polyester polyol. In still other embodiments, the composition may be described as being, including, consisting essentially of, or consisting of the polycarbodiimide and the graft polyol.

The terminology "consisting essentially of" may describe that, in this embodiment, the composition is substantially free of additional solvents. Alternatively, in some embodiments the composition may simply be free of solvents. Non-limiting examples of solvents include, but are not limited to, organic solvents such as acetone, benzene, toluene, ethers, acetates, volatile organic solvents, and combinations thereof. The terminology "substantially free" refers to an amount of solvents present in the composition of less than about 1 part by weight per 100 parts by weight of the composition. In one embodiment, the composition is completely free of solvents.

The terminology "consisting essentially of" may also describe that, in this embodiment, the composition is free of additional catalysts, e.g. non-carbodiimidization catalysts. Alternatively, in some embodiments the composition may simple be free of any catalysts. Non-limiting examples of catalysts include, but are not limited to, metal containing catalysts, e.g. alcoholates of an alkali metal or of an alkaline earth metal, copper salts, tin compounds, etc. The terminology "substantially free" refers to an amount of catalysts present in the composition of less than about 1 part by weight per 100 parts by weight of the composition. If there is catalyst in the composition, the catalyst may be the same as the one used preparation of polycarbodiimide. In one embodiment, the composition is completely free of catalysts. In one embodiment, the composition is free of any catalysts with the exception of phospholene oxide catalysts.

The composition has excellent pot life properties. Pot life is the useable life of the composition. More specifically, pot life is defined as when the combined viscosity doubles. Of course, atmospheric and climatic conditions can also affect the pot life of the composition. In various embodiments, the composition has a pot life of greater than about 0.5, alternatively greater than about 1.0, alternatively greater than about 1.5, alternatively greater than about 2, years when tested in accordance with ASTM D 2196-05, at 74° F. and 20% RH. Alternatively, in various embodiments, the composition has a pot life of up to 1.5, alternatively up to 2, alternatively up to 2.5, years when tested in accordance with ASTM D 2196-05, at 74° F. and 20% RH and/or when measured via Fourier transform infrared spectroscopy ("FTIR") spectroscopy.

With respect to viscosity, in some embodiments, the composition (including the polycarbodiimide and polyol) exhibits no evidence of reaction (as measured via Differential Scanning calorimetry) from about 25 to about 80° C. To this end, the composition is not only stable over time, i.e., has a long pot life, but is also stable as temperatures fluctuate up to 80° C.

A method of producing the polyiso-urea is also provided. The method includes the steps of providing the capped polycarbodiimide and the polyol, combining the capped polycarbodiimide and the polyol component to form the composition set forth above, and reacting the capped polycarbodiimide and the polyol to form the polyiso-urea.

In some embodiments, the method includes a first step of forming the capped polycarbodiimide. The process/method of forming the capped polycarbodiimide and the steps thereof are described in detail above. Said differently, the method can include any of the steps disclosed above for forming the capped polycarbodiimide. In various embodiments of the method, the steps of providing the monoisocyanate, the diisocyanate, the oxygen scavenger, and the carbodiimidization catalyst; combining the monoisocyanate, the diisocyanate, the oxygen scavenger, and the carbodiimidization catalyst to form a reaction mixture; and heating the reaction mixture to a temperature and for a time sufficient to form the polycarbodiimide having 0.25 wt. % or less of free isocyanate groups are also included in the method. In these embodiments, the steps of combining and heating are conducted in the absence of a solvent. Of course, any of the steps and conditions set forth above with respect to forming the capped polycarbodiimide can be included in these embodiments.

In certain embodiments, the capped polycarbodiimide is cooled to about room temperature prior to combining the capped polycarbodiimide and the polyol component to form the composition. Alternatively, the composition may be combined with the polyol at a temperature other than room temperature, e.g. at a temperature between room temperature and about 180, alternatively from about 120 to about 180, alternatively from about 120 to about 160, ° C. to increase the viscosity and the turbidity of the composition.

In various embodiments, the step of reacting the capped polycarbodiimide and the polyol is carried out above room temperature. Specifically, in some embodiments, the step of reacting the capped polycarbodiimide and the polyol to form the polyiso-urea is further defined as heating the composition to a temperature a temperature of from about 60 to about 250, alternatively from about 60 to about 200, alternatively from about 60 to about 180, alternatively from about 120 to about 180, alternatively from about 140 to about 160, ° C. Further, the step of heating is typically conducted in less than 60, alternatively less than about 40, alternatively from about 5 to about 200, alternatively from about 10 to about 60, minutes.

It is to be appreciated that the temperature at which the capped polycarbodiimide and the polyol are reacted is contingent on the reactivity of the specific capped polycarbodiimide and the polyol utilized, the catalysts (if used), and, to some extent, the relative amounts thereof. As such, the capped polycarbodiimide and the polyol are reacted may deviate from the ranges set forth above without departing form the scope of the present disclosure.

During heating, the viscosity and the turbidity of the composition increases with time, i.e., turbidity and time are directly proportional. Said differently, the reaction mixture typically becomes more viscous and turbid as time progresses during the step of reacting the capped polycarbodiimide and the polyol (initial viscosity decreases and then increases as the chemical reaction between the polycarbodiimide and the polyol proceed). The reaction mixture may have various degrees of viscosity and turbidity without departing from the scope of the present disclosure (the compositions formed were most often clear, however, turbidity did vary as a function of the molecular weight and the EO/PO ratio of the polyol). Further, the reaction can be stopped at any viscosity and/or turbidity level. In some embodiments, the method includes a second heating step to further react the capped polycarbodiimide and the polyol to form the polyiso-urea without departing from the scope of the present disclosure.

The polyiso-urea is also disclosed herein. The polyiso-urea includes the reaction product of a capped polycarbodiimide having 0.25 wt. % or less of free isocyanate groups which is a liquid at 25° C. and a polyol. As set forth above, the capped polycarbodiimide comprises the reaction product of the diisocyanate and the monoisocyanate in the presence of the oxygen scavenger and the carbodiimidization catalyst and in the absence of the solvent.

In some embodiments, the polyiso-urea has greater than about 5, alternatively greater than about 10, alternatively greater than about 15, alternatively greater than about 20, alternatively greater than about 25, alternatively from about 5 to about 60, alternatively from about 5 to about 40, alternatively from about 10 to about 30, wt. % iso-urea groups.

In some embodiments, the polyiso-urea has a ratio of iso-urea groups to polycarbodiimide groups of from about 100:1 to about 1:20, alternatively from about 10:1 to about 1:2, alternatively from about 10:1 to about 1:1, alternatively from about 100:1 to about 10:1, alternatively from about 100:1 to about 25:1. Of course, in many embodiments, 100% of the polycarbodiimide groups are converted to iso-urea groups.

In various embodiments, the amount type of polyol is reacted with an amount of the polycarbodiimide such that an excess of hydroxyl groups is present in the composition. In such embodiments, a hydroxy functional polyiso-urea, i.e., a polyiso-urea comprising a hydroxy functional group is formed. In other embodiments, an equivalent amount of hydroxyl functionality and polycarbodiimide functionality is present in the composition which results in the formation of a "crosslinked polymer network."

In some embodiments, the polyiso-urea having the following formula:

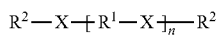

wherein
each $R^1$ is independently an alkyl, a cycloalkyl, an aromatic, a heterocyclic, or a heteroaryl group
each $R^2$ is independently an alkyl, a cycloalkyl, an aromatic, a heterocyclic, or a heteroaryl group;
each X is independently:
a carbodiimide group having the following structure:

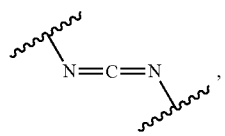 [SMILES: *N=C=N*]

or
an iso-urea group having the following structure:

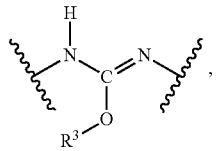

or
an optical or geometric isomer of the iso-urea group.

In these embodiments, at least one X is polyiso-urea group. Further, each $R^3$ is independently an alkyl, a cycloalkyl, an aromatic, a heterocyclic, or a heteroaryl group and each $R^2$ is independently an alkyl, a cycloalkyl, an aromatic, a heterocyclic, or a heteroaryl group. And n is an integer from 1 to 50.

As set forth above, $R^1$ and $R^2$ may individually be alkyl, cycloalkyl, aromatic, heterocyclic, or heteroaryl. In some embodiments of the above compounds, $R^1$ and $R^2$ may individually be $C_1$-$C_{12}$ alkyl, $C_1$-$C_{12}$ cycloalkyl, a $C_6$-$C_{12}$ aromatic, a $C_6$-$C_{12}$ heterocyclic, or a $C_6$-$C_{12}$ heteroaryl group. For example, $R^1$ and $R^2$ may individually be a methylene, ethylene, propylene, isopropylene, butylene, pentylene, hexylene, heptylene, octylene, nonylene, decalinylene, dodecylene, 1,2-cyclohexylene, 1,3-cyclohexylene, 1,4-cyclohexylene, 1,2-phenylene, 1,3-phenylene, 1,4-phenylene, tolyl, or xylyl. In some preferred embodiments, $R^1$ is an aryl group. For example, $R^1$ may preferably be phenyl, tolyl, or xylyl. In other preferred embodiments, $R^2$ is an aryl group. For example, $R^2$ may preferably be phenyl, tolyl, or xylyl.

As set forth above, each $R^3$ is independently an alkyl, a cycloalkyl, an aromatic, a heterocyclic, or a heteroaryl group and each $R^2$ is independently an alkyl, a cycloalkyl, an aromatic, a heterocyclic, or a heteroaryl group. In one specific embodiment R3 is hydroxyl functional.

The chemist of ordinary skill will recognize that certain compounds of this disclosure will contain atoms which may be in a particular optical or geometric configuration. All such isomers are included in this disclosure. Iso-urea isomers are preferred, and are set forth below:

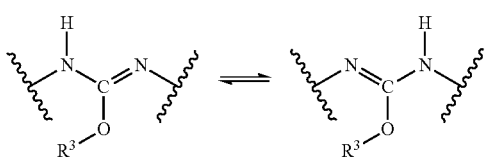

Further, it should be appreciated that these configurations also include the iso-urea to urea rearrangement, which is set forth below:

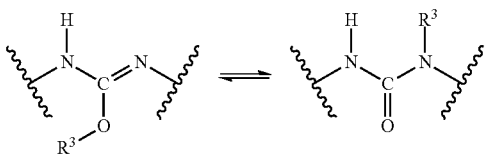

Further, in some embodiments, the polyiso-urea is a liquid at 25° C. In other embodiments, the polyurea is a solid at room temperature.

The polyiso-urea is used in a wide variety of commercial products including lubricants, adhesives, sealants, coatings, composites, and even as an elastomeric resin which can be formed into various articles.

The following examples are intended to illustrate the disclosure and are not to be viewed in any way as limiting to the scope of the disclosure.

EXAMPLES

Preparation of the Capped Polycarbodiimide

Example 1: Preparation of a Toluene Diisocyanate-Based Polycarbodiimide

An 80:20 mixture of the 2,4- and 2,6-isomers of toluene diisocyanate (492.7 g) is placed in a flask with triphenyl phosphite (TPP, 1.0 g), and the flask is then heated to 70° C. Once heated to 70° C., phenyl isocyanate (505.3 g) and phospholene oxide (5% solution in toluene, 1.0 g) are added, and the flask is heated to 106° C. for 7 hours. Additional phospholene oxide (0.3 g) is then added and the flask heated to 110° C. for another 7 hours. The amount of residual NCO groups (expressed as Fnco (free NCO)) is 0.56 wt. %.

Example 2: Alternative Preparation of a Toluene Diisocyanate-Based Polycarbodiimide An 80:20 mixture of the 2,4- and 2,6-isomers of toluene diisocyanate (492.7 g) is placed in a flask with triphenyl phosphite (TPP, 1.0 g), and the flask is then heated to 70° C. Once heated to 70° C., phenyl isocyanate (505.3 g) is added, and the flask contents stirred until the temperature is again at 70° C. At temperature, phospholene oxide (5% solution in toluene, 1.0 g) is added, and the flask is heated to 106° C. for 8.5 hours. Fnco is 0.79 wt. %.

Example 3: Alternative Preparation of a Toluene Diisocyanate-Based Polycarbodiimide An 80:20 mixture of the 2,4- and 2,6-isomers of toluene diisocyanate (492.7 g) is placed in a flask with triphenyl phosphite (TPP, 1.0 g), and the flask is then heated to 70° C. At temperature, phenyl isocyanate (505.3 g) is added, and the flask contents stirred until the temperature is again at 70° C. At temperature, phospholene oxide (5% solution in toluene, 1.5 g) is added, and the flask is heated to 120° C. for 1 hour. At this time, 1.5 g of phospholene oxide (5% solution in toluene) is added, and the flask is heated to 120° C. for 4 hours. Two different runs provided Fnco values of 0.28 wt. % and 0.44 wt. %. It is noteworthy that in such samples, the Fnco may be attributable to both residual monomer and polymer NCO content. However, the overall amount of NCO content attributable to free TDI (toluene diisocyanate) is less than 0.1 wt. %.

Example 4

In other examples, the procedure of Example 3 may be followed with ratios of 2,4-toluene diisocyanate:2,6-toluene diisocyanate ranging from 100:0 to 65:35.

Examples 5-54 are polyiso-ureas formed with the Polycarbodiimide 1 (formed via the method of Example 1 above) and the exemplary polyols set forth in Tables 1A and 1B below. To form Examples 5-54, polycarbodiimide 1 and each respective the polyol are added to a beaker and mixed to form a composition. The composition is transferred to an aluminum pan. The aluminum pan, with the composition therein, is placed in an oven preheated to about 125° C. The composition polymerizes upon heating. During heating, the polymerization of the composition is monitored visually and observations regarding viscosity/flow ability of the composition are made. The reaction rate of the polymerization varies depending on the particular composition being reacted. For most compositions, the composition solidifies in about 35 minutes.

TABLE 1A

| Ex. No. | Technical Description | Catalytic (Y/N) | OH No. | Equiv. Wt. |
|---|---|---|---|---|
| 5 | Methoxypolyethylene Glycol | N | 350 | 160 |
| 6 | Methoxypolyethylene Glycol | N | 550 | 102 |
| 7 | Perfluorooctan-1-ol | N | 154 | 354 |
| 8 | Ethylene Glycol | N | 1810 | 31 |
| 9 | 1,3-Propylene Glycol | N | 1476 | 38 |
| 10 | 1,4-Butanediol | N | 1247 | 45 |
| 11 | 1,5-Pentanediol | N | 1079 | 52 |
| 12 | Hexanediol | N | 951 | 59 |
| 13 | Diethylene Glycol | N | 1058.5 | 53 |
| 14 | Triethylene Glycol | N | 748 | 75 |
| 15 | Dipropylene Glycol | N | 837 | 67 |
| 16 | Tripropylene Glycol | N | 584 | 96 |
| 17 | Glycerine | N | 1828 | 31 |
| 18 | Trimethylolpropane | N | 1254 | 45 |
| 19 | Pentaerythritol | N | 1650 | 34 |
| 20 | Bisphenol A Ethoxylate | N | 227.5 | 247 |
| 21 | Polypropylene glycol | N | 260 | 216 |
| 22 | Polypropylene glycol | N | 145 | 387 |
| 23 | Polypropylene glycol | N | 107 | 524 |
| 24 | Polypropylene glycol | N | 56.1 | 1000 |
| 25 | Polypropylene glycol | N | 29 | 1934 |
| 26 | Polytetrahydrofuran | N | 449 | 125 |
| 27 | Polytetrahydrofuran | N | 173 | 324 |
| 28 | Polytetrahydrofuran | N | 112 | 501 |
| 29 | Polytetrahydrofuran | N | 56 | 1002 |

TABLE 1B

| Ex. No. | Technical Description | Catalytic (Y/N) | OH No. | Equiv. Wt. |
|---|---|---|---|---|
| 30 | Polymerized fatty diol | N | 207 | 271 |
| 31 | Hydroxyl terminated polybutadiene resin | N | 101 | 555 |
| 32 | Hydroxyl terminated polybutadiene resin | N | 47.1 | 1191 |

TABLE 1B-continued

| Ex. No. | Technical Description | Catalytic (Y/N) | OH No. | Equiv. Wt. |
|---|---|---|---|---|
| 33 | Epoxidized hydroxyl terminated Polybutadiene | N | 108 | 519 |
| 34 | Polyether polyol | N | 920 | 61 |
| 35 | Polyether polyol | N | 935 | 60 |
| 36 | Natural Oil polyol | N | 162 | 346 |
| 37 | Polyether polyol | N | 398 | 141 |
| 38 | Polyether polyol | N | 230 | 244 |
| 39 | Polyether polyol | N | 55 | 1002 |
| 40 | Polypropylene Carbonate (PPC) polyol | N | 187 | 300 |
| 41 | Graft polyether polyol containing copolymerized styrene and acrylonitrile | Y | 70 | 801 |
| 42 | Polyether polyol | N | 30 | 1870 |
| 43 | Polyester polyol | N | 300 | 187 |
| 44 | Polyester polyol | N | 305 | 184 |
| 45 | Polyether polyol | Y | 450 | 125 |
| 46 | Polyether polyol | Y | 395 | 142 |
| 47 | Polyether polyol | Y | 390 | 144 |
| 48 | Polyether polyol | N | 555 | 101 |
| 49 | Polyether polyol | N | 450 | 125 |
| 50 | Polyether polyol | N | 370 | 152 |
| 51 | Polyether polyol | N | 280 | 200 |
| 52 | Polyether polyol | Y | 767 | 73 |
| 53 | Polyether poylol | Y | 425 | 132 |
| 54 | Polyether polyol | Y | 470 | 119 |

TABLE 2A

| | Polyol | | Polycarbodiimide | |
|---|---|---|---|---|
| Ex. No. | Weight* (grams) | Equivalents | Weight (grams) | Equivalents |
| 5 | 100 | 0.63 | 250 | 0.63 |
| 6 | 100 | 0.98 | 392 | 0.98 |
| 7 | 100 | 0.28 | 113 | 0.28 |
| 8 | 100 | 3.23 | 1290 | 3.23 |
| 9 | 100 | 2.63 | 1053 | 2.63 |
| 10 | 100 | 2.22 | 889 | 2.22 |
| 11 | 100 | 1.92 | 769 | 1.92 |
| 12 | 100 | 1.69 | 678 | 1.69 |
| 13 | 100 | 1.89 | 755 | 1.89 |
| 14 | 100 | 1.33 | 533 | 1.33 |
| 15 | 100 | 1.49 | 597 | 1.49 |
| 16 | 100 | 1.04 | 417 | 1.04 |
| 17 | 100 | 3.23 | 1290 | 3.23 |
| 18 | 100 | 2.22 | 889 | 2.22 |
| 19 | 100 | 2.86 | 1143 | 2.86 |
| 20 | 100 | 0.40 | 162 | 0.40 |
| 21 | 100 | 0.46 | 185 | 0.46 |
| 22 | 100 | 0.26 | 103 | 0.26 |
| 23 | 100 | 0.19 | 76 | 0.19 |
| 24 | 100 | 0.10 | 40 | 0.10 |
| 25 | 100 | 0.05 | 21 | 0.05 |
| 26 | 100 | 0.82 | 328 | 0.82 |
| 27 | 100 | 0.31 | 123 | 0.31 |
| 28 | 100 | 0.20 | 80 | 0.20 |
| 29 | 100 | 0.10 | 40 | 0.10 |

*Weights may vary, examples normalized to 100 g.

TABLE 2B

| | Polyol | | Polycarbodiimide | |
|---|---|---|---|---|
| Ex. No. | Weight* (grams) | Equivalents | Weight (grams) | Equivalents |
| 30 | 100 | 0.37 | 148 | 0.37 |
| 31 | 100 | 0.18 | 72 | 0.18 |
| 32 | 100 | 0.08 | 34 | 0.08 |
| 33 | 100 | 0.19 | 77 | 0.19 |

TABLE 2B-continued

| | Polyol | | Polycarbodiimide | |
|---|---|---|---|---|
| Ex. No. | Weight* (grams) | Equivalents | Weight (grams) | Equivalents |
| 34 | 100 | 1.64 | 656 | 1.64 |
| 35 | 100 | 1.67 | 667 | 1.67 |
| 36 | 100 | 0.29 | 116 | 0.29 |
| 37 | 100 | 0.71 | 284 | 0.71 |
| 38 | 100 | 0.41 | 164 | 0.41 |
| 39 | 100 | 0.10 | 40 | 0.10 |
| 40 | 100 | 0.33 | 133 | 0.33 |
| 41 | 100 | 0.12 | 50 | 0.12 |
| 42 | 100 | 0.05 | 21 | 0.05 |
| 43 | 100 | 0.54 | 217 | 0.54 |
| 44 | 100 | 1.64 | 656 | 1.64 |
| 45 | 100 | 0.80 | 320 | 0.80 |
| 46 | 100 | 0.72 | 288 | 0.72 |
| 47 | 100 | 0.69 | 278 | 0.69 |
| 48 | 100 | 0.99 | 396 | 0.99 |
| 49 | 100 | 0.80 | 320 | 0.80 |
| 50 | 100 | 0.66 | 263 | 0.66 |
| 51 | 100 | 0.50 | 200 | 0.50 |
| 52 | 100 | 1.37 | 548 | 1.37 |
| 53 | 100 | 0.76 | 303 | 0.76 |
| 54 | 100 | 0.84 | 336 | 0.84 |

*Weights may vary, examples normalized to 100 g.

Examples 10 and 37 from the Tables above are tested via thermal gravimetric analysis (TGA), dynamic mechanical analysis (DMA), a Differential Scanning calorimeter (DSC), and Fourier transform infrared spectroscopy (FTIR).

FIG. 1 is a thermal gravimetric analysis (TGA) of the chemical reaction/polymerization of the composition of Example 37. Specifically, 6.4870 mg of the composition of Example 37 is analyzed in air on a TA Instruments TGA Q5000.

Figure 2:
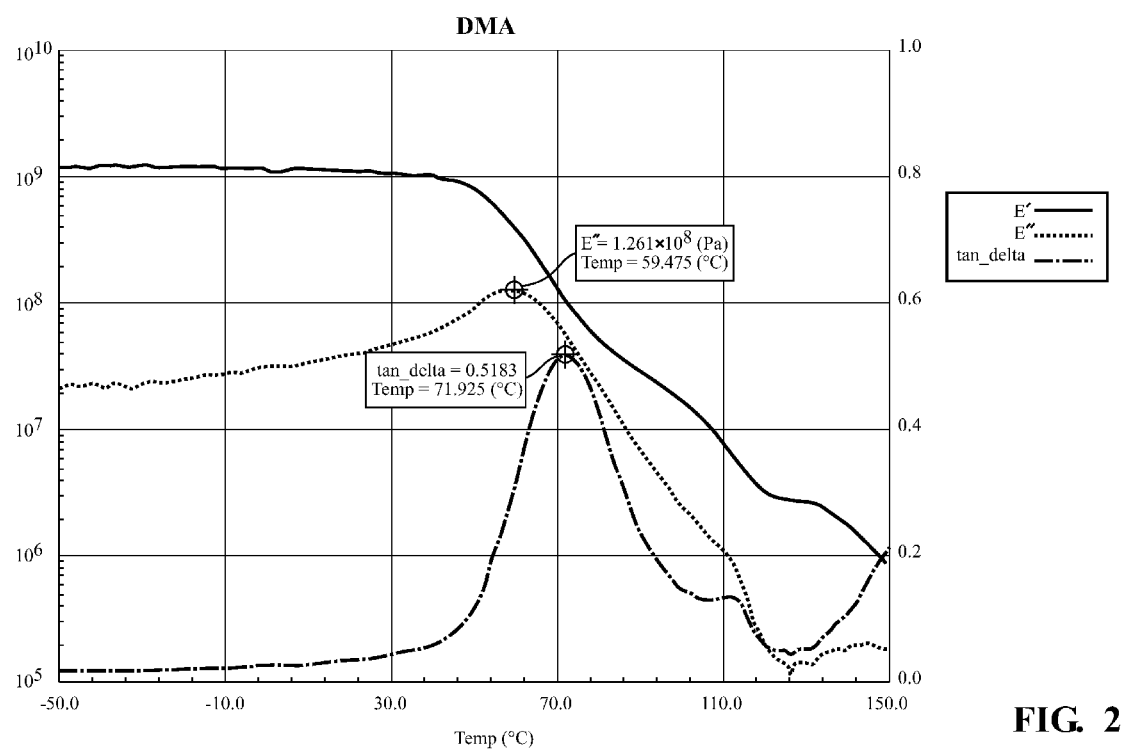
FIG. 2 is a dynamic mechanical analysis (DMA) of the polyiso-urea of FIG. 1.

FIG. 2 is a dynamic mechanical analysis (DMA) of the chemical reaction/polymerization of the composition of Example 37. Specifically, a sample is analyzed using a dynamic temperature ramp method at a heating rate of 5° C./min using a TA Instruments RSA3 DMA (error±2° C.).

Figure 3:
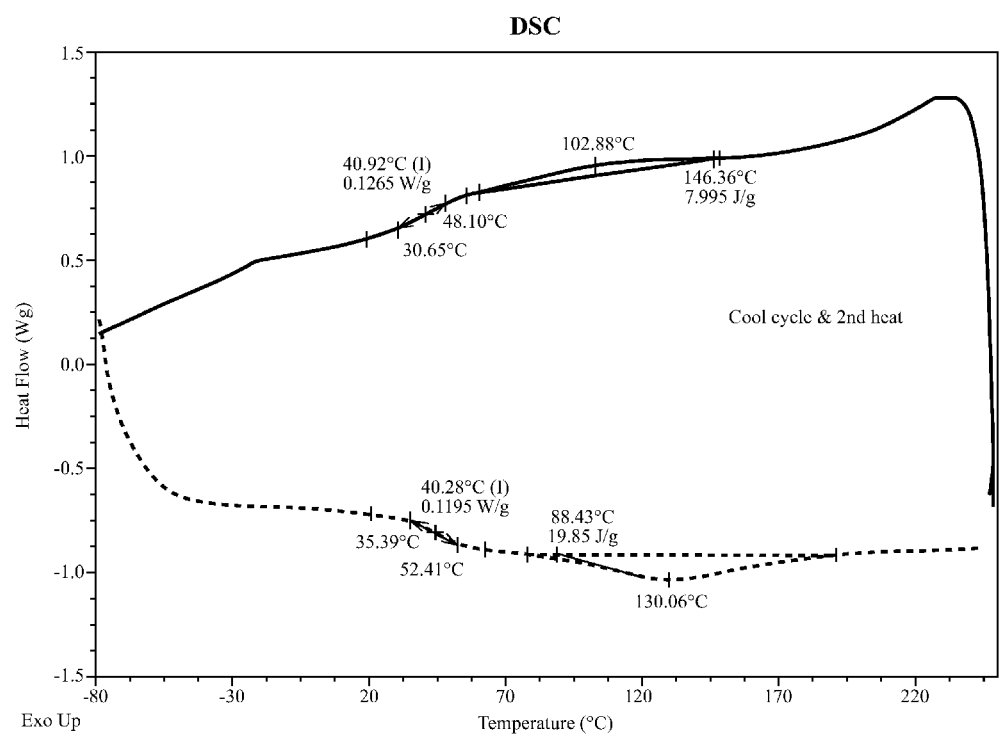
FIG. 3 is differential scanning calorimetry (DSC) analysis of the polyiso-urea of FIG. 1.

FIG. 3 is a Differential Scanning calorimeter (DSC) analysis of the chemical reaction/polymerization of 3.87 mg of the composition of Example 37 over a range of temperatures from −90° C. to 200° C. at a rate of 10° C. per minute. Specifically, 3.87 mg of the composition of Example 37 is analyzed in air on a TA Instruments DSC Q200.

Figure 4:
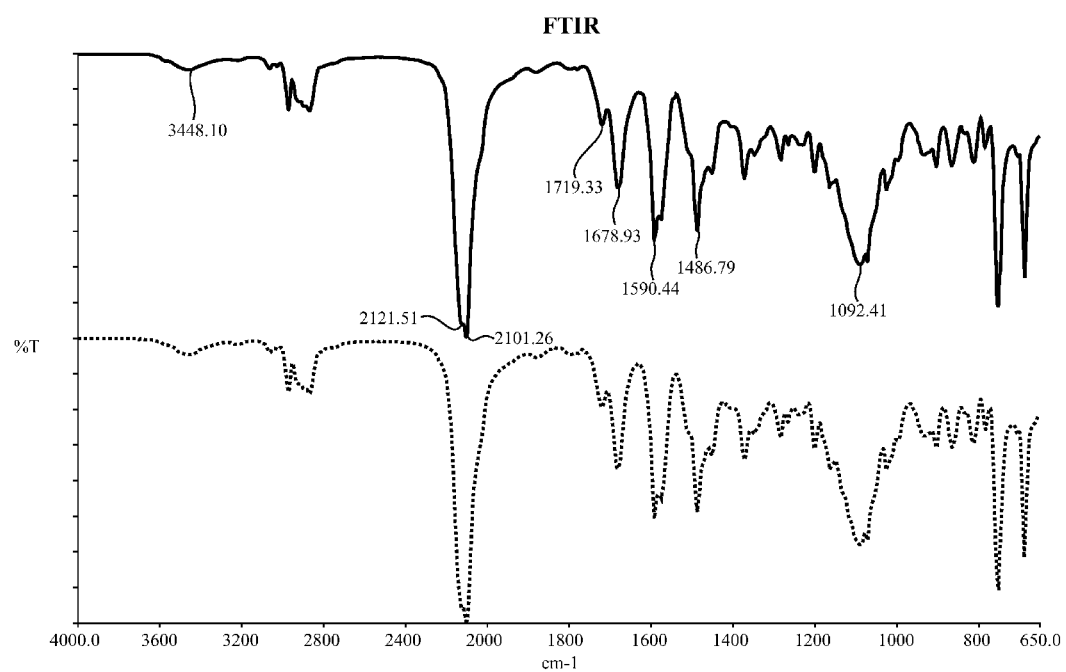
FIG. 4 is a Fourier transform infrared spectroscopy (FTIR) spectrum of the composition of FIG. 1.
Figure 5:
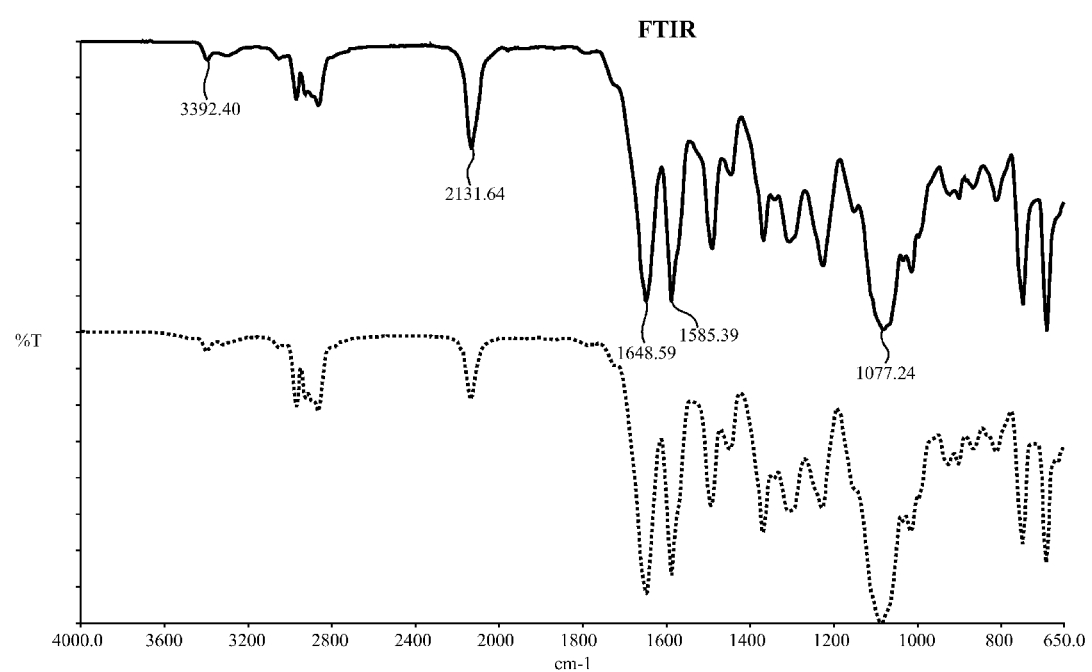
FIG. 5 is a Fourier transform infrared spectroscopy ("FTIR") spectrum of the polyiso-urea of FIG. 1.

Referring now to FIGS. 4 and 5, the composition of Example 37 and Example 37 (comprising the polymerized composition) was analyzed via FTIR spectroscopy. Referring now to FIG. 4, the composition of Example 37 exhibits a large peak at around 2200 cm$^{-1}$, which indicates the presence of polycarbodiimide groups. In contrast, Example 37 exhibits a smaller carbodiimide peak at around 2200 cm$^{-1}$, and a larger peak at around 1650 cm$^{-1}$, which indicates the presence of iso-urea groups.

Figure 6:
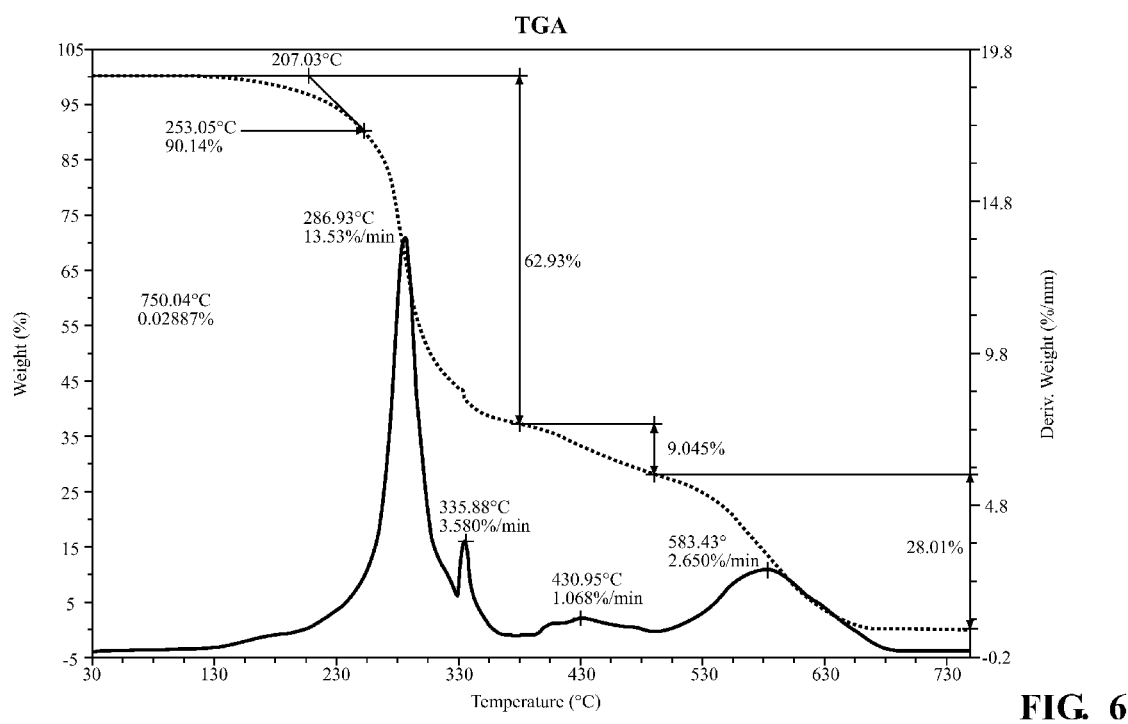
FIG. 6 is a thermal gravimetric analysis (TGA) of the chemical reaction between a capped polycarbodiimide, a polyol, and a diol, and the formation of a polyiso-urea.

FIG. 6 is a thermal gravimetric analysis (TGA) of the chemical reaction/polymerization of the composition of Example 10. Specifically, 6.4870 mg of the composition of Example 10 is analyzed in air on a TA Instruments TGA Q5000.

Figure 7:
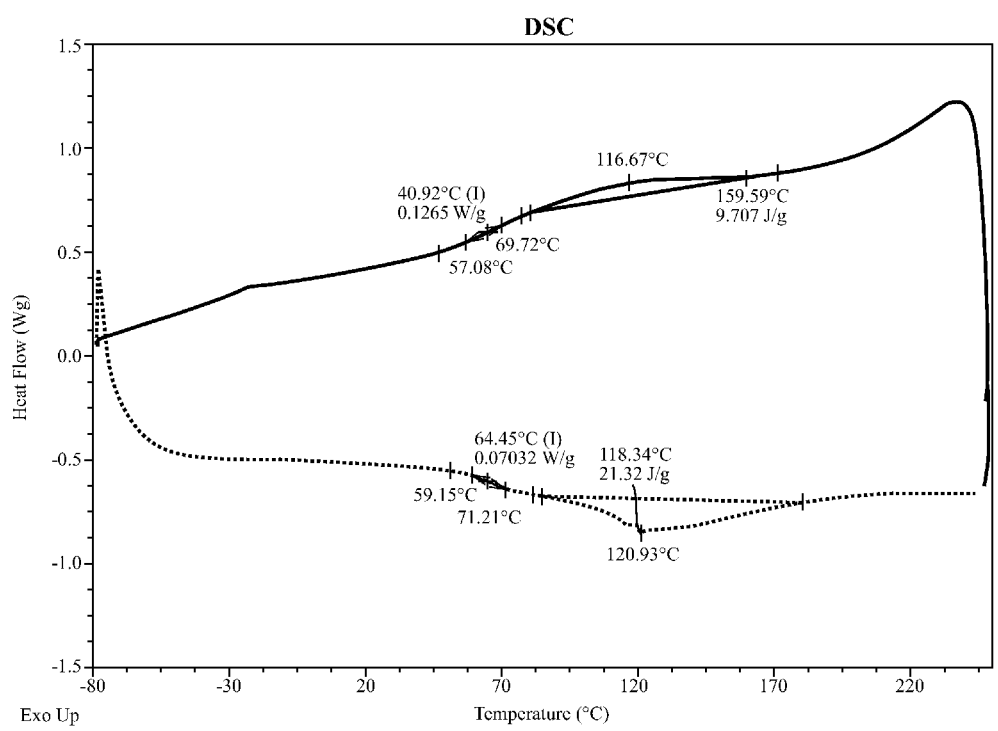
FIG. 7 is differential scanning calorimetry (DSC) analysis of the polyiso-urea of FIG. 6.

FIG. 7 is a Differential Scanning calorimeter (DSC) analysis of the chemical reaction/polymerization of 4.28 mg of the composition of Example 10 over a range of temperatures from −90° C. to 200° C. at a rate of 10° C. per minute is analyzed in air on a TA Instruments DSC Q200.

Figure 8:
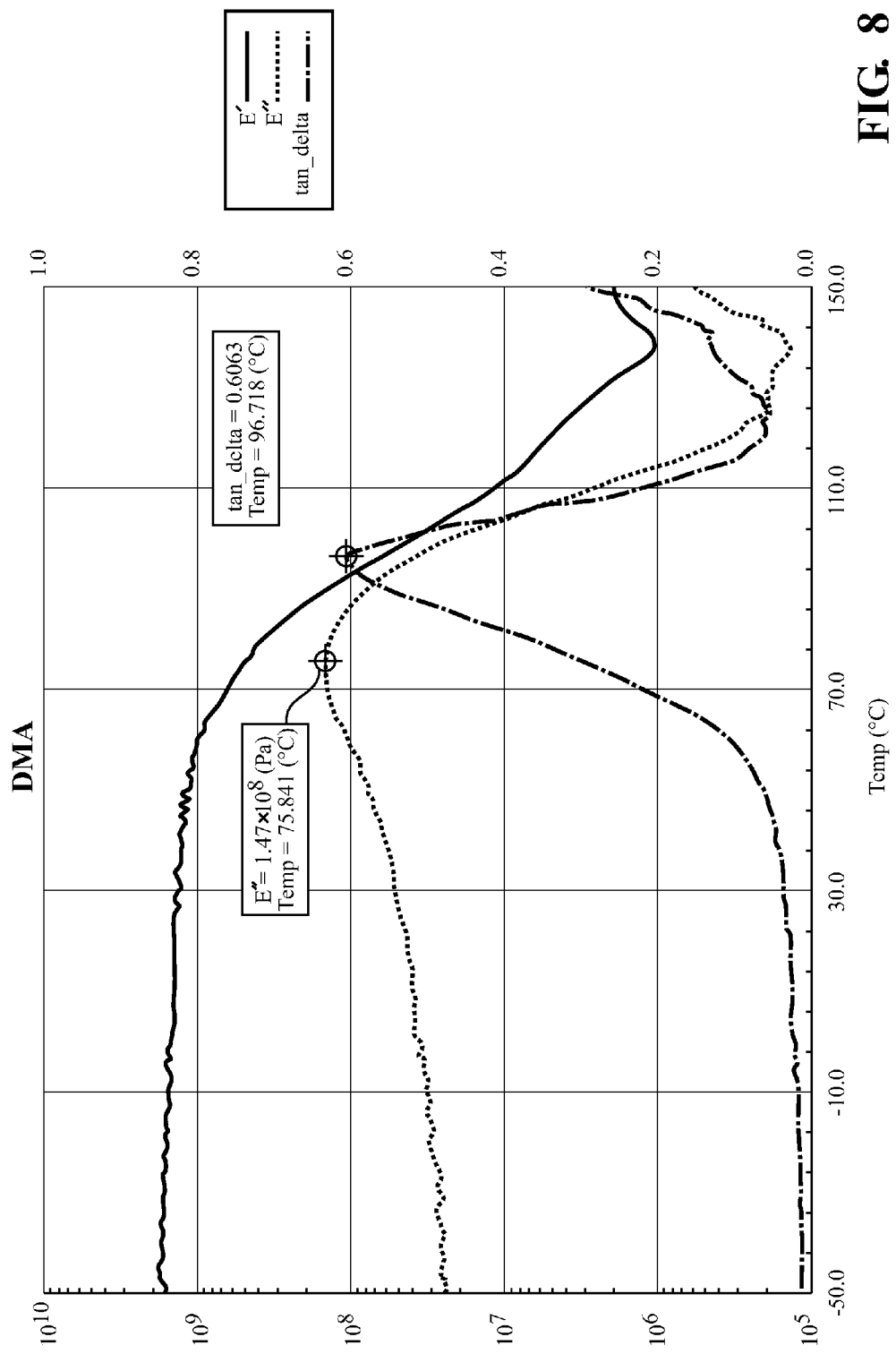
FIG. 8 is a dynamic mechanical analysis (DMA) of the polyiso-urea of FIG. 6.

FIG. 8 is a dynamic mechanical analysis (DMA) of the chemical reaction/polymerization of the composition of Example 10. Specifically, a sample is analyzed using a dynamic temperature ramp method at a heating rate of 5° C./min using a TA Instruments RSA3 DMA (error±2° C.).

In view of the date above, the polyiso-urea of Example 37 exhibits lower heat distortion and a 0.5 tan delta value, i.e., exhibits some thermoplastic properties. In contrast, the polyiso-urea of Example 10 exhibits higher heat distortion and a 0.6 tan delta value, i.e., some thermoset properties. As such, the composition and method described herein can be used to form thermosets and thermoplastics, which can be tailored to specific applications.

It is to be understood that the appended claims are not limited to express and particular compounds, components, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is to be understood that "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A composition for forming a polyiso-urea, said composition comprising:
   a capped polycarbodiimide comprising the reaction product of a diisocyanate and a monoisocyanate reacted in the presence of an oxygen scavenger and a carbodiimidization catalyst which is different than said oxygen scavenger, and in the absence of solvent, wherein said capped polycarbodiimide is a liquid at 25° C. and has 0.25 wt. % or less of free isocyanate; and
   a polyether polyol and/or a catalytic polyol, wherein said catalytic polyol is derived from an amine-based initiator.

2. A composition as set forth in claim 1 wherein said diisocyanate is selected from 2,4-toluene diisocyanate, 2,6-toluene diisocyanate, and combinations thereof and said monoisocyanate is an aromatic monoisocyanate.

3. A composition as set forth in claim 1 wherein said capped polycarbodiimide has the following formula:

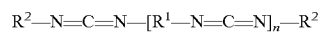

wherein each $R^1$ is an alkyl, a cycloalkyl, an aromatic, a heterocyclic, or a heteroaryl group, each $R^2$ is independently an alkyl, a cycloalkyl, an aromatic, a heterocyclic, or a heteroaryl group, and n is an integer from 1 to 100.

4. A composition as set forth in claim 3 wherein $R^2$ is a $C_1$-$C_{12}$ alkyl, a $C_1$-$C_{12}$ cycloalkyl, a $C_6$-$C_{12}$ aromatic, a $C_6$-$C_{12}$ heterocyclic, or a $C_6$-$C_{12}$ heteroaryl.

5. A composition as set forth in claim 3 wherein R' is a $C_1$-$C_{12}$ alkyl, a $C_1$-$C_{12}$ cycloalkyl, a $C_6$-$C_{12}$ aromatic, a $C_6$-$C_{12}$ heterocyclic, or a $C_6$-$C_{12}$ heteroaryl group.

6. A composition as set forth in claim 1 wherein said polyol has a nominal functionality of from about 2 to about 8 and/or a number average molecular weight of equal to or less than about 1,500 g/mol.

7. A composition as set forth in claim 1 consisting essentially of said capped polycarbodiimide and said polyol.

8. A composition as set forth in claim 1 having a pot life of greater than 0.5 years.

9. A composition as set forth in claim 1 which is substantially free of any catalysts other than carbodiimidization catalysts.

10. A method of producing a polyiso-urea with the composition set forth in claim 1, said method comprising the steps of:
    providing the capped polycarbodiimide;
    providing the polyol;
    combining the capped polycarbodiimide and the polyol component to form the composition set forth in claim 1; and
    reacting the capped polycarbodiimide and the polyol to form the polyiso-urea.

11. A method as set forth in claim 10 wherein the step of reacting the capped polycarbodiimide and the polyol to form the polyiso-urea is further defined as heating the composition to a temperature of about 60 to about 250° C. and/or is conducted in less than about 60 minutes.

12. A method as set forth in claim 10 wherein the step of reacting the capped polycarbodiimide and the polyol to form the polyiso-urea is conducted in the absence of a catalyst other than a carbodiimidization catalyst.

* * * * *